United States Patent
Lee et al.

(10) Patent No.: US 11,360,711 B2
(45) Date of Patent: Jun. 14, 2022

(54) STORAGE DEVICE TEMPORARILY SUSPENDING INTERNAL OPERATION TO PROVIDE SHORT READ RESPONSE TIME FOR READ REQUEST FROM HOST

(71) Applicant: SAMSUNG ELECTRONICS CO., LTD., Suwon-si (KR)

(72) Inventors: Chulseung Lee, Seoul (KR); Seonghoon Woo, Hwaseong-si (KR); Kyuwook Han, Seoul (KR); Daehyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/092,860

(22) Filed: Nov. 9, 2020

(65) Prior Publication Data

US 2021/0055888 A1 Feb. 25, 2021

Related U.S. Application Data

(63) Continuation of application No. 15/960,644, filed on Apr. 24, 2018, now Pat. No. 10,831,405.

(30) Foreign Application Priority Data

Sep. 8, 2017 (KR) .......................... 10-2017-0115350

(51) Int. Cl.
*G06F 3/06* (2006.01)
*G06F 13/28* (2006.01)

(52) U.S. Cl.
CPC ............ *G06F 3/0659* (2013.01); *G06F 3/061* (2013.01); *G06F 3/0611* (2013.01);
(Continued)

(58) Field of Classification Search
CPC ....... G06F 13/28; G06F 12/0246; G06F 3/061
See application file for complete search history.

(56) References Cited

U.S. PATENT DOCUMENTS

| 4,989,113 A | 1/1991 | Hull, Jr. et al. |
| 5,379,381 A | 1/1995 | Lamb |

(Continued)

FOREIGN PATENT DOCUMENTS

JP 2005135240 A 5/2005

OTHER PUBLICATIONS

Cai, Yu, et al. "Error characterization, mitigation, and recovery in flash-memory-based solid-state drives." Proceedings of the IEEE 105.9 (Aug. 18, 2017): 1666-1704. (Year: 2017).

(Continued)

*Primary Examiner* — Charles Rones
*Assistant Examiner* — Hewy H Li
(74) *Attorney, Agent, or Firm* — Volentine, Whitt & Francos, PLLC

(57) ABSTRACT

A storage device includes a first memory device, a second memory device, and a controller. The first memory device and the second memory device share the same channel to communicate with the controller. Communication between the first memory device and the controller and communication between the second memory device and the controller are mutually exclusive. When the controller receives a read request directed to the second memory device while the controller processes a direct memory access (DMA) operation directed to the first memory device, the controller suspends the DMA operation and transmits a read command associated with the read request to the second memory device.

11 Claims, 16 Drawing Sheets

(52) U.S. Cl.
CPC .......... *G06F 3/0656* (2013.01); *G06F 3/0673* (2013.01); *G06F 3/0679* (2013.01); *G06F 13/28* (2013.01)

(56) References Cited

U.S. PATENT DOCUMENTS

| | | | |
|---|---|---|---|
| 5,822,251 | A | 10/1998 | Bruce et al. |
| 6,148,360 | A | 11/2000 | Leak et al. |
| 7,562,180 | B2 | 7/2009 | Gyl et al. |
| 7,769,918 | B2 | 8/2010 | Shah et al. |
| 8,296,505 | B2 | 10/2012 | Min et al. |
| 8,327,039 | B2 | 12/2012 | Chou et al. |
| 9,141,572 | B2 | 9/2015 | Triece et al. |
| 2004/0167998 | A1 | 8/2004 | Core |
| 2008/0162790 | A1 | 7/2008 | Im |
| 2008/0209109 | A1 | 8/2008 | Lasser |
| 2010/0229032 | A1* | 9/2010 | Lee ............... G06F 11/1044 714/6.12 |
| 2012/0179860 | A1 | 7/2012 | Falanga et al. |
| 2013/0205085 | A1* | 8/2013 | Hyun .............. G06F 3/0659 711/114 |
| 2015/0262630 | A1* | 9/2015 | Shirakawa ............ G06F 3/0634 711/125 |
| 2016/0306553 | A1* | 10/2016 | Ellis ................ G06F 12/02 |
| 2016/0313946 | A1* | 10/2016 | Zang ................ G06F 3/0679 |
| 2017/0003909 | A1 | 1/2017 | Cho |
| 2018/0004410 | A1* | 1/2018 | Madraswala ........... G06F 3/061 |
| 2018/0032264 | A1 | 2/2018 | Gomez et al. |
| 2018/0052789 | A1* | 2/2018 | Chen ................ G06F 9/5038 |
| 2019/0004710 | A1* | 1/2019 | Ebsen ................ G06F 3/0611 |
| 2019/0005031 | A1 | 1/2019 | Li et al. |

OTHER PUBLICATIONS

"Direct Memory Access (DMA)", University of British Columbia. <www.ece.ubc.ca/~edc/379.jan99/lectures/lec13.pdf>. (Year 1999).
Larrivee, Steve, "Solid State Drive Primer #8", Published May 25, 2015.

* cited by examiner

STORAGE DEVICE TEMPORARILY SUSPENDING INTERNAL OPERATION TO PROVIDE SHORT READ RESPONSE TIME FOR READ REQUEST FROM HOST

CROSS-REFERENCE TO RELATED APPLICATIONS

This is a Continuation of U.S. application Ser. No. 15/960,644, filed Apr. 24, 2018, now U.S. Pat. No. 10,831,405 issued Nov. 10, 2020, and a claim of priority under 35 U.S.C. § 119 is made to Korean Patent Application No. 10-2017-0115350 filed on Sep. 8, 2017, in the Korean Intellectual Property Office, the entire contents of both applications being incorporated herein by reference.

TECHNICAL FIELD

The present disclosure relates to an electronic device, and more particularly, relates to operations and configurations of a storage device which stores and outputs data.

DISCUSSION OF THE RELATED ART

In recent years, various kinds of electronic devices are being used. An electronic device performs its own functions according to operations of electronic circuits included therein. A storage device is an example of electronic devices. The storage device stores data or outputs the stored data, and thus provides a user with a storage service.

Meanwhile, as various electronic devices are used by many people and a large amount of data is created, speed of data communication becomes faster and faster. For this reason, processing a large amount of data rapidly and transmitting/receiving a large amount of data rapidly are become an important issue in a field of electric/electronic technologies.

For example, in the storage device, storing data rapidly and outputting the stored data rapidly are important to improve performance of the storage device and satisfaction of a user. When data is output late from the storage device, the user who requests the storage device to output data may feel inconvenience. In addition, when data output is delayed even though subsequent processing on a large amount of data is required, quality of the overall service may be degraded.

SUMMARY

Example embodiments of the present disclosure may provide configurations and operations of a storage device which is capable of providing a short, read response time for a read request from a host. In some example embodiments, the storage device may temporarily suspend an internal operation (e.g., a direct memory access (DMA) operation) to rapidly respond to the read request from the host.

In some example embodiments, a storage device may include, at least, a first memory device, a second memory device, and a controller. The first memory device may be connected to one channel of a plurality of channels, and the second memory device may also be connected to the one channel to share the same channel with the first memory device. The controller may communicate with the first memory device through the shared channel or communicate with the second memory device through the shared channel, such that communication with the first memory device and communication with the second memory device are mutually exclusive. When the controller receives a read request directed to the second memory device from a host while the controller processes a direct memory access (DMA) operation directed to the first memory device, the controller may suspend the DMA operation and may transmit a read command associated with the read request to the second memory device. The controller may resume the suspended DMA operation after transmitting the read command to the second memory device.

In some example embodiments, while the controller processes the resumed DMA operation, the second memory device may temporarily store data read from memory cells of the second memory device in a page buffer of the second memory device, in response to the read command. Processing the resumed DMA operation may be performed concurrently with storing the data of the memory cells in the page buffer.

In some example embodiments, after the resumed DMA operation is completed, the second memory device may output data to the controller based on the read command.

In some example embodiments, when a reference time lapses while the controller processes the resumed DMA operation, the controller may re-suspend the resumed DMA operation such that the second memory device outputs data based on the read command. After the second memory device completely outputs the data based on the read command, the controller may resume the re-suspended DMA operation. For example, the second memory device may output data associated with the read request to the controller before the DMA operation is completed, and the controller may output read data to the host based on the data output from the second memory device, before the DMA operation is completed.

In some example embodiments, a storage device includes first and second memory devices and a memory controller. The memory controller writes data into and reads data from the first and second memory devices through a first channel by which the memory controller communicates with only one of the first and second memory devices at a time. And, the memory controller suspends communication with the first memory device during a memory operation to communicate a read command to the second memory device.

According to some example embodiments, a storage device may rapidly output read data which is requested from a host. Accordingly, quality of service and the satisfaction of a user may be improved.

BRIEF DESCRIPTION OF THE DRAWINGS

The above and other objects and features will become apparent from the following description with reference to the following figures, wherein like reference numerals refer to like parts throughout the various figures unless otherwise specified, and wherein.

DETAILED DESCRIPTION OF EXAMPLE EMBODIMENTS

Below, some example embodiments will be described in detail and clearly with reference to accompanied drawings such that those skilled in the art can easily implement the example embodiments.

Figure 1:
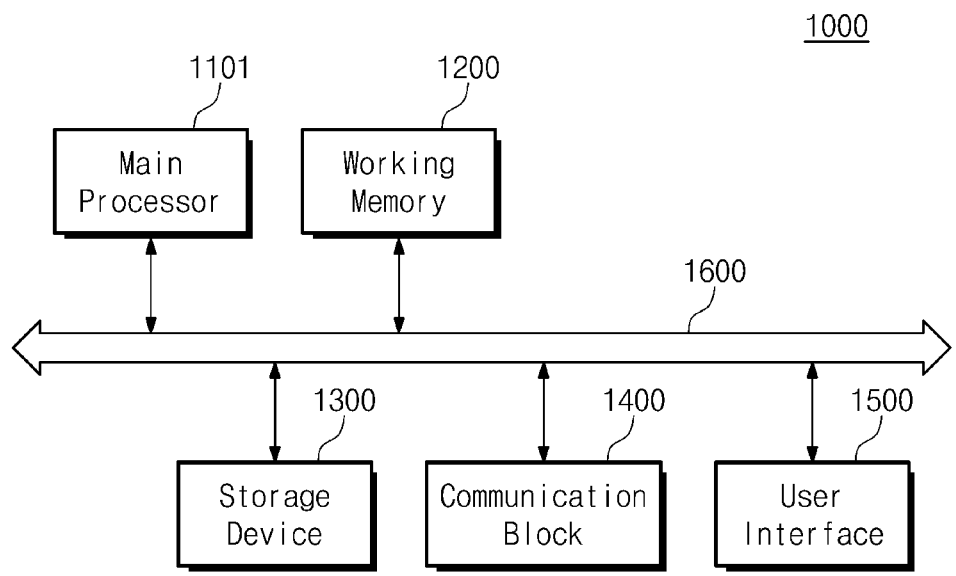
FIG. 1 is a block diagram illustrating an example configuration of an electronic system which includes a storage device according to some example embodiments.

FIG. 1 is a block diagram illustrating an example configuration of an electronic system 1000 which includes a storage device 1300 according to some example embodiments.

The electronic system 1000 may include a main processor 1101, a working memory 1200, the storage device 1300, a communication block 1400, a user interface 1500, and a bus 1600. For example, the electronic system 1000 may be one of electronic devices such as a desktop computer, a laptop computer, a tablet computer, a smart phone, a wearable device, a video game console, a workstation, one or more servers, an electric vehicle, home appliance, a medical device, and/or the like.

The main processor 1101 may control overall operations of the electronic system 1000. The main processor 1101 may include one or more processor cores, and may be implemented with a general-purpose processor, a special-purpose processor, or an application processor.

The working memory 1200 may store data used in an operation of the electronic system 1000. For example, the working memory 1200 may include a volatile memory such as a static random access memory (SRAM), a dynamic RAM (DRAM), a synchronous DRAM (SDRAM), and/or a nonvolatile memory such as a phase-change RAM (PRAM), a magneto-resistive RAM (MRAM), a resistive RAM (ReRAM), and/or a ferroelectric RAM (FRAM).

The storage device 1300 may store data regardless of power being supplied. For example, the storage device 1300 may include a nonvolatile memory device such as a flash memory, a PRAM, an MRAM, a ReRAM, an FRAM, and/or the like. For example, the storage device 1300 may include a storage medium such as a solid-state drive (SSD), a card storage, an embedded storage, and/or the like.

The communication block 1400 may communicate with an external device/system of the electronic system 1000. To this end, the communication block 1400 may support at least one of various wired/wireless communication protocols. The user interface 1500 may include various input/output interfaces to arbitrate communication between a user and the electronic system 1000.

The bus 1600 may provide a communication path between components of the electronic system 1000. The components of the electronic system 1000 may exchange data with each other in compliance with a bus format of the bus 1600. For example, the bus format may include one or more of various interface protocols such as universal serial bus (USB), small computer system interface (SCSI), peripheral component interconnect express (PCIe), mobile PCIe (M-PCIe), advanced technology attachment (ATA), parallel ATA (PATA), serial ATA (SATA), serial attached SCSI (SAS), nonvolatile memory express (NVMe), universal flash storage (UFS), and/or the like.

The storage device 1300 may be implemented according to example embodiments of the present disclosure. The storage device 1300 may rapidly respond to a read request from a host (e.g., the main processor 1101) to provide a short, read response time. Example configurations and example operations of the storage device 1300 will be described with reference to FIGS. 2 to 17.

The storage device 1300 is provided in the following descriptions, but the present disclosure is not limited thereto. The example embodiments may be employed in any type of device including a memory element. For example, the example embodiments may be employed even for a volatile memory and/or a nonvolatile memory included in the working memory 1200. The following descriptions are provided to facilitate better understanding, and are not intended to limit the present disclosure.

Figure 2:
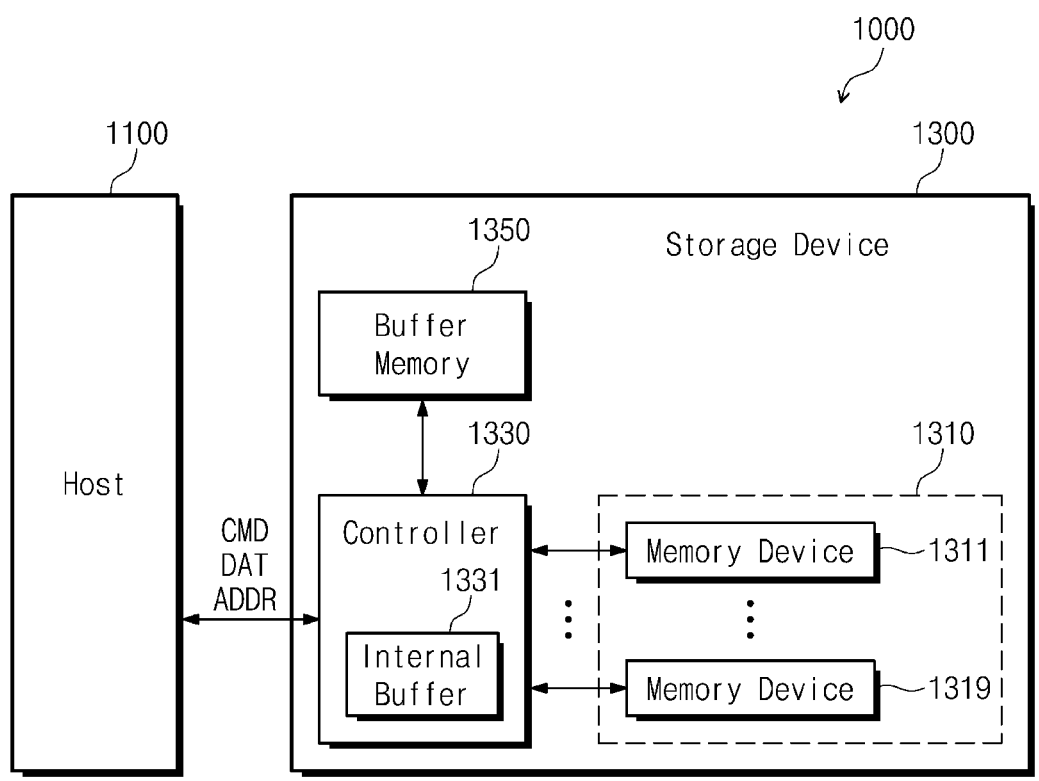
FIG. 2 is a block diagram illustrating an example configuration associated with a storage device of FIG. 1.

FIG. 2 is a block diagram illustrating an example configuration associated with the storage device 1300 of FIG. 1.

As described with reference to FIG. 1, the main processor 1101 may communicate with the storage device 1300 through the bus 1600. In the present disclosure, an object which is able to access the storage device 1300 may be referred to as a "host" (e.g., a host 1100). The main processor 1101 may be an example of objects which are able to operate as the host 1100, but the present disclosure is not limited thereto.

The host 1100 may exchange data DAT with the storage device 1300. The storage device 1300 may provide a storage service to the host 1100 in response to a command CMD from the host 1100.

For example, the host 1100 may provide the storage device 1300 with the command CMD including a write request and the data DAT including write data. The storage device 1300 may store the requested write data during a write operation, in response to the write request. For example, the host 1100 may provide the storage device 1300 with the command CMD including a read request. The storage device 1300 may output requested read data to the host 1100 during a read operation, in response to the read request.

The storage device 1300 may include memory devices 1310, a controller 1330, and a buffer memory 1350. FIG. 2 illustrates two memory devices 1311 and 1319, but the number of memory devices included in the storage device 1300 may be variously changed or modified.

Each of the memory devices 1311 and 1319 may store or output data requested by the host 1100. To this end, each of the memory devices 1311 and 1319 may include memory area(s) for storing data. For example, each of the memory devices 1311 and 1319 may include a NAND-type flash memory, and may be implemented according to a V-NAND scheme or a Z-NAND scheme. However, as described with reference to FIG. 1, a type and a configuration of each of the memory devices 1311 and 1319 may be variously changed or modified.

A memory area may be identified based on a value called an "address". Write data may be stored in a memory area directed by an address, and read data may be output from a memory area directed by an address. The host 1100 may provide an address ADDR to the storage device 1300 to exchange the data DAT in association with a specific memory area of the memory devices 1311 and 1319.

The controller 1330 may control overall operations of the storage device 1300. In some example embodiments, the controller 1330 may include an internal buffer 1331. The internal buffer 1331 may include a volatile memory such as an SRAM, a DRAM, an SDRAM, and/or the like, and/or a nonvolatile memory such as a PRAM, an MRAM, a ReRAM, an FRAM, and/or the like.

The internal buffer 1331 may temporarily store the data DAT, the command CMD, and the address ADDR received from the host 1100. The internal buffer 1331 may temporarily store data output from the memory devices 1311 and 1319.

The controller 1330 may control the memory devices 1311 and 1319 and may process various operations such that data requested by the host 1100 is stored or output. In some cases, the controller 1330 may control the memory devices 1311 and 1319 and may process various operations such that data is stored or output without intervention of the host 1100. For example, an internal operation which is processed without intervention of the host 1100 may include a direct memory access (DMA) operation.

The DMA operation may include a DMA write operation for storing data in the memory devices 1311 and 1319 without intervention of the host 1100. Additionally, or alternatively, the DMA operation may include a DMA read operation for outputting data from the memory devices 1311 and 1319 without intervention of the host 1100.

For example, when the host 1100 intends to store write data in the memory devices 1311 and 1319, the controller 1330 may receive the write data and may store the received write data in the internal buffer 1331. The controller 1330 may provide the host 1100 with a response indicating that the write data is well received, regardless of whether the write data is actually stored in the memory devices 1311 and 1319. Afterwards, the controller 1330 may process the DMA write operation to store the write data of the internal buffer 1331 in the memory devices 1311 and 1319.

For example, when invalid data is generated in the memory devices 1311 and 1319 and an available capacity becomes insufficient, the controller 1330 may control a garbage collection operation to secure an available capacity. The garbage collection operation may accompany the DMA read operation for reading data from the memory devices 1311 and 1319 and the DMA write operation for writing data in the memory devices 1311 and 1319.

Besides, the controller 1330 may process the DMA operation under various conditions. The above examples are provided to facilitate better understanding, and are not intended to limit the present disclosure.

The controller 1330 may include one or more hardware components (e.g., an analog circuit and a logic circuit) which are configured to perform operations described above and to be described below. In addition, the controller 1330 may include one or more processor cores. The operations of the controller 1330 described above and to be described below may be implemented with a program code of software and/or firmware, and processor core(s) of the controller 1330 may execute an instruction set of the program code. The processor core(s) of the controller 1330 may process various kinds of arithmetic operations and/or logical operations to execute the instruction set.

The buffer memory 1350 may buffer data used in an operation of the storage device 1300. The buffer memory 1350 may include a volatile memory such as an SRAM, a DRAM, an SDRAM, and/or the like, and/or a nonvolatile memory such as a PRAM, an MRAM, a ReRAM, an FRAM, and/or the like.

Figure 3:
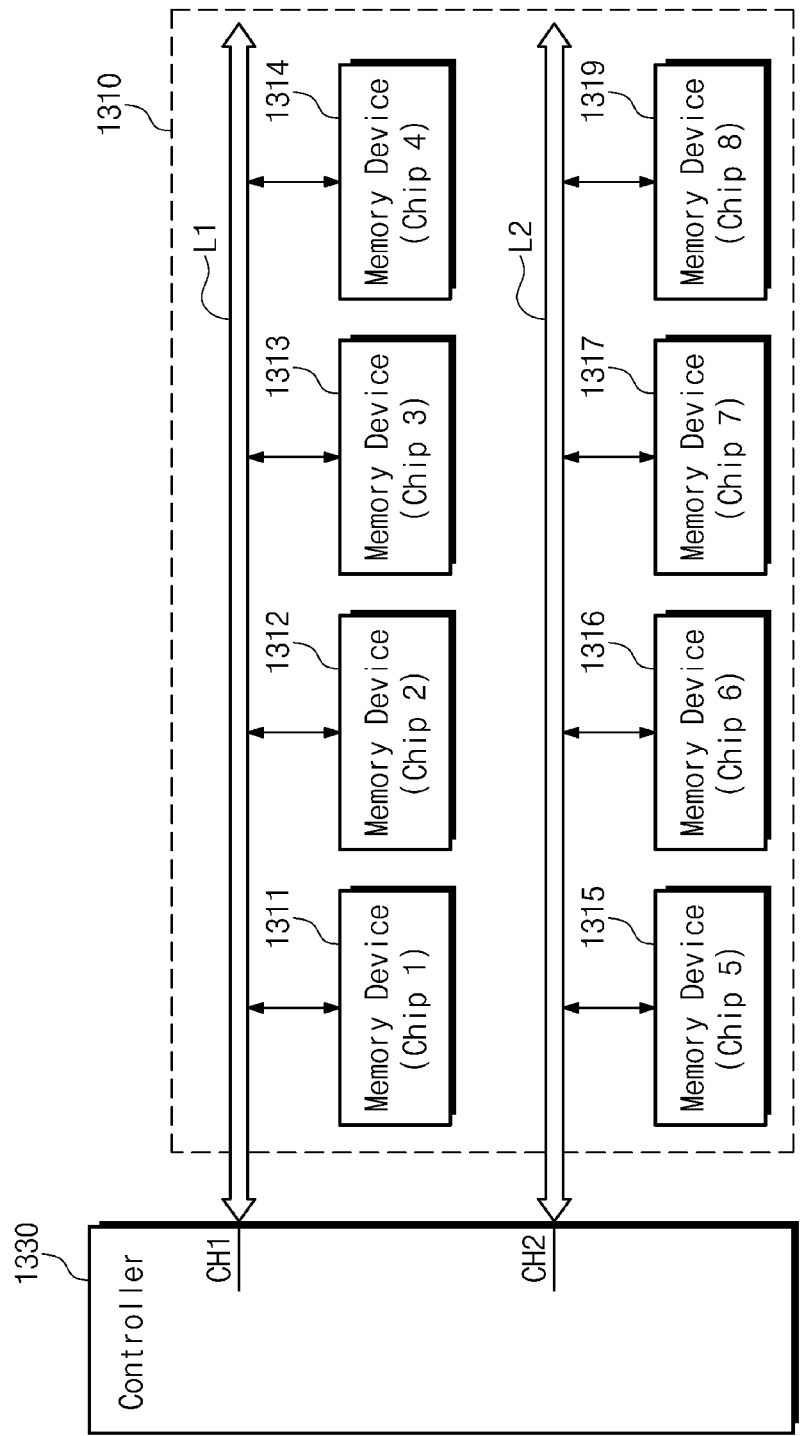
FIG. 3 is a block diagram illustrating an example configuration of a storage device of FIG. 1.

FIG. 3 is a block diagram illustrating an example configuration of the storage device 1300 of FIG. 1.

For example, the memory devices 1310 may include memory devices 1311 to 1317 and 1319. The memory devices 1312 to 1317 may store or output data like the memory devices 1311 and 1319. Each of the memory devices 1312 to 1317 may be configured to be the same as or similar to each of the memory devices 1311 and 1319. Alternatively, each of the memory devices 1312 to 1317 may include a memory of a different type from those of the memory devices 1311 and 1319.

The memory devices 1311 to 1317 and 1319 may be separately implemented on independent chips. For example, eight (8) memory devices 1311 to 1317 and 1319 may be separately implemented on eight chips. In the following descriptions, a memory device may be referred to as a memory chip, and the terms "memory device" and "memory chip" may be interchangeably used.

Each of the memory devices 1311 to 1317 and 1319 may operate in response to a chip enable signal. Memory devices which are able to operate together in response to the same chip enable signal may be understood as constituting one "way". In the following descriptions, it will be assumed that one memory device constitutes one way to operate in response to one chip enable signal (e.g., it will be assumed that one way is constituted by one memory device). However, this assumption is provided to facilitate better understanding, and is not intended to limit the present disclosure.

The controller 1330 may be connected to the memory devices 1311 to 1317 and 1319 through a plurality of channels. For example, the controller 1330 may exchange data with the memory devices 1311 to 1317 and 1319 through channels CH1 and CH2. The channels CH1 and CH2 may provide data input/output paths for the memory devices 1311 to 1317 and 1319.

The channels CH1 and CH2 may be associated with communication lines L1 and L2 which are configured to transfer data between the memory devices 1311 to 1317 and 1319 and the controller 1330. The communication lines L1 and L2 may include a wire, a conductive pattern, a trace pattern, and/or the like, which is configured to transfer an electric signal. The communication lines L1 and L2 may provide a communication path between the memory devices 1311 to 1317 and 1319 and the controller 1330.

Memory devices of one group, among the memory devices 1311 to 1317 and 1319, may share one of the channels CH1 and CH2. For example, the memory devices 1311 to 1314 of a first group may share the channel CH1 along the communication line L1, and the memory devices 1315 to 1317 and 1319 of a second group may share the channel CH2 along the communication line L2.

The memory devices 1311 to 1314 may be connected to the shared channel CH1, and the controller 1330 may communicate with the memory devices 1311 to 1314 through the shared channel CH1. The memory devices 1315 to 1317 and 1319 may be connected to the shared channel CH2, and the controller 1330 may communicate with the memory devices 1315 to 1317 and 1319 through the shared channel CH2.

Communication between memory devices sharing the same channel and the controller 1330 may be mutually exclusive. The controller 1330 may selectively communicate with one of memory devices connected to a shared channel, such that communication with the memory devices sharing the same channel is not performed concurrently or simultaneously. On the other hand, communication between memory devices connected to different channels and the controller 1330 may not be mutually exclusive.

For example, communication between the memory device 1312 and the controller 1330 may not be performed while communication between the memory device 1311 and the controller 1330 is performed through the channel CH1. The memory device 1312 may communicate with the controller 1330 through the channel CH1 when communication between the memory devices 1311, 1313, and 1314 and the controller 1330 is not performed. For example, communication through the channel CH1 between the memory device 1311 and the controller 1330 may be performed concurrently or simultaneously with communication through the channel CH2 between the memory device 1319 and the controller 1330.

FIG. 3 illustrates eight (8) memory devices 1311 to 1317 and 1319 and two (2) channels CH1 and CH2. However, the example configuration of FIG. 3 is provided to facilitate better understanding, and is not intended to limit the present disclosure. The number of memory devices and the number of channels may be variously changed or modified. In addition, the number of memory devices sharing the same channel (e.g., the number of memory devices included in one group) may be variously changed or modified.

Figure 4:
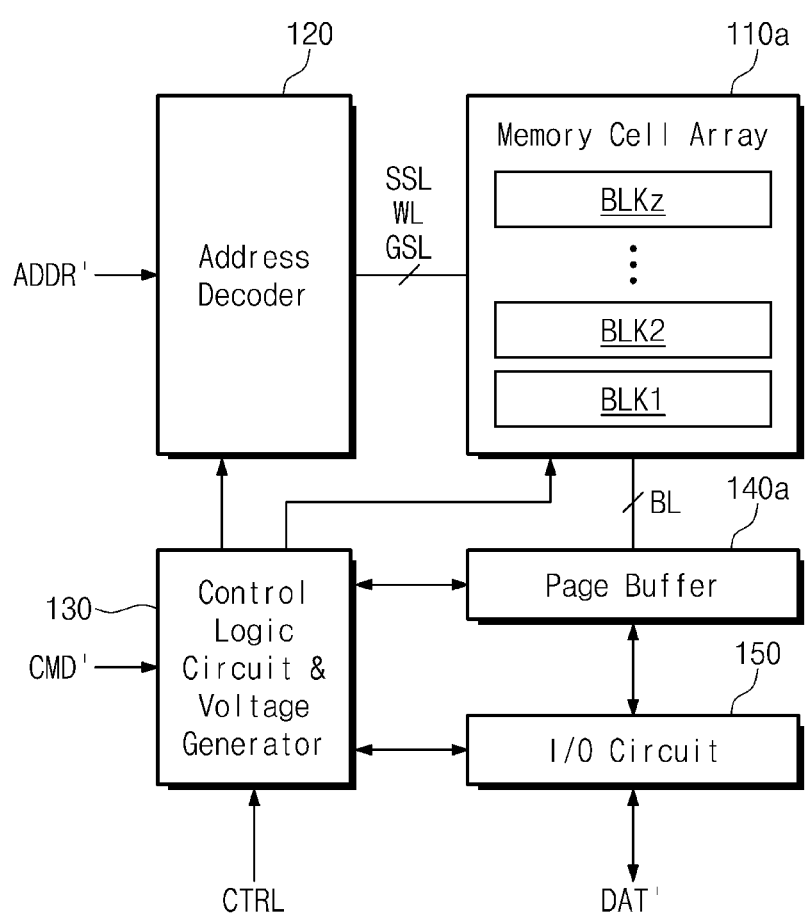
FIG. 4 is a block diagram illustrating one of memory devices of FIG. 3.

FIG. 4 is a block diagram illustrating one memory device 1311 of the memory devices 1311 to 1317 and 1319 of FIG. 3.

The memory device 1311 may include a memory cell array 110a, an address decoder 120, a control logic circuit and voltage generator 130, a page buffer 140a, and an input/output (I/O) circuit 150. Each of other memory devices 1312 to 1317 and 1319 may be configured to be the same as or similar to the memory device 1311.

The memory cell array 110a may include a plurality of memory blocks BLK1 to BLKz. Each of the memory blocks BLK1 to BLKz may include a plurality of cell strings. Each of the cell strings may include a plurality of memory cells. The memory cells may be connected to a plurality of word lines WL. Each memory cell may store a data bit. Each memory cell may be a single level cell (SLC) for storing one bit or a multi-level cell (MLC) for storing at least two bits.

In some example embodiments, the memory cell array 110a may include a three-dimensional (3D) memory array. The 3D memory array may be monolithically formed in one or more physical levels of memory cell arrays each having an active area arranged on a silicon substrate and a circuit associated with an operation of memory cells. The circuit associated with the operation of the memory cells may be arranged in a substrate or on a substrate. The term "monolithic" means that layers of respective levels of the 3D memory array are directly deposited on layers of lower levels of the 3D memory array.

The 3D memory array may include vertical NAND strings which are vertically oriented such that at least one memory cell is located over another memory cell. At least one memory cell may include a charge trap layer. Each vertical NAND string may include at least one selection transistor located over memory cells. At least one selection transistor may be configured with the same structure as the memory cells, and be monolithically formed together with the memory cells.

The address decoder 120 may be connected to the memory cell array 110a through the word lines WL, string selection lines SSL, and ground selection lines GSL. The address decoder 120 may decode an address ADDR' received from the controller 1330. The address decoder 120 may select at least one of the word lines WL based on the decoded address, and may drive the selected word line.

The control logic circuit and voltage generator 130 may control the address decoder 120, the page buffer 140a, and the input/output circuit 150, based on a command CMD' and a control signal CTRL received from the controller 1330. For example, the control logic circuit and voltage generator 130 may control the address decoder 120, the page buffer 140a, and the input/output circuit 150, such that data DAT' provided from the controller 1330 is stored in the memory cell array 110a or such that data stored in the memory cell array 110a is output.

The control logic circuit and voltage generator 130 may generate various voltages (e.g., a program voltage, a pass voltage, a read voltage, a verification voltage, and/or the like) used to operate the memory device 1311. The control logic circuit and voltage generator 130 may provide the generated voltages to the address decoder 120 or a substrate of the memory cell array 110a.

The page buffer 140a may be connected to the memory cell array 110a through a plurality of bit lines BL. The page buffer 140a may control the bit lines BL such that data DAT' provided from the input/output circuit 150 is stored in the memory cell array 110a. The page buffer 140a may read data stored in the memory cell array 110a and may provide the read data DAT' to the input/output circuit 150.

For example, the page buffer 140a may receive data from the input/output circuit 150 in units of a page, or may read data from the memory cell array 110a in units of a page. The page buffer 140a may temporarily store data received from the input/output circuit 150 and data read from the memory cell array 110a. For example, the page buffer 140a may include data latches for storing data.

The input/output circuit 150 may provide the page buffer 140a with data DAT' received from the controller 1330. Alternatively, the input/output circuit 150 may provide the controller 1330 with data received from the page buffer 140a. For example, the input/output circuit 150 may exchange the data DAT' with the controller 1330 in synchronization with the control signal CTRL.

Figure 5:
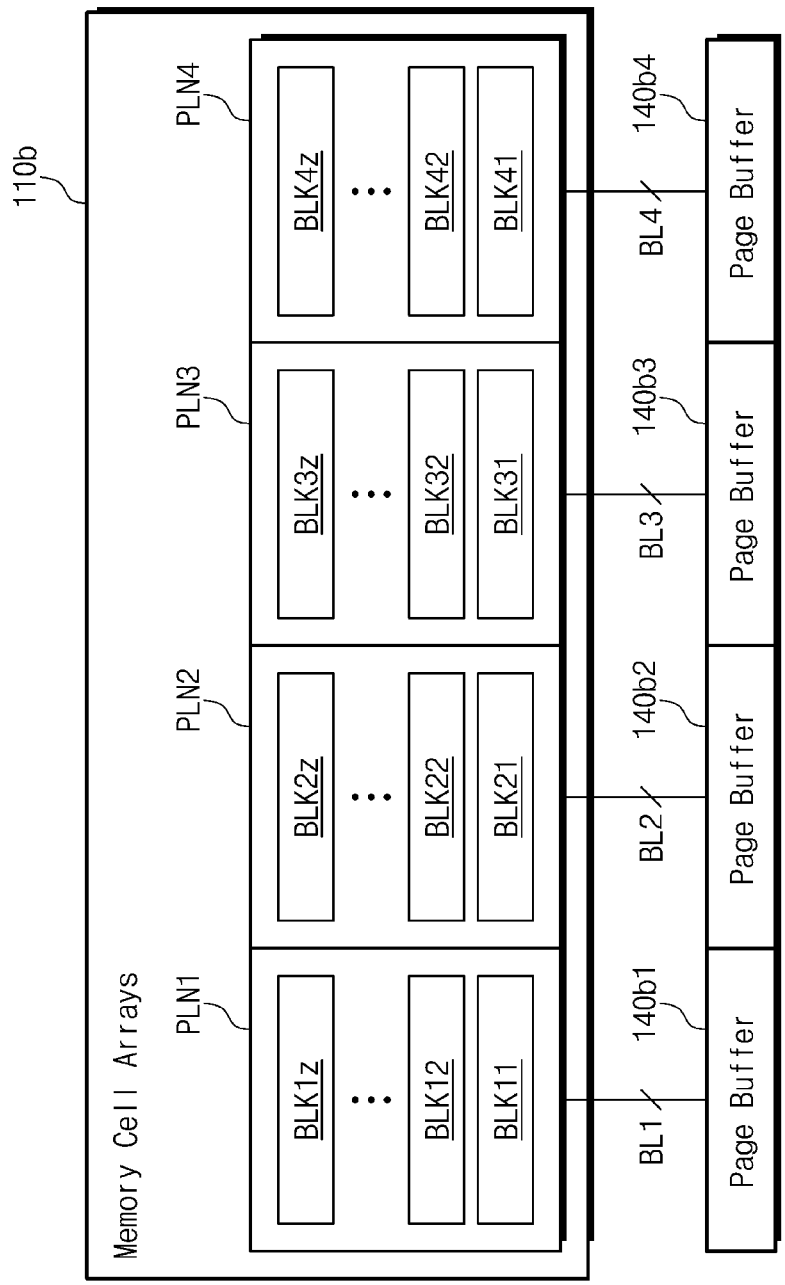
FIG. 5 is a block diagram illustrating an example configuration of a memory cell array of FIG. 4.

FIG. 5 is a block diagram illustrating an example configuration of the memory cell array 110a of FIG. 4.

FIG. 4 illustrates an example configuration including the single memory cell array 110a and the single page buffer 140a. However, in some example embodiments, the memory device 1311 may be implemented with a multi-plane structure, and may include memory cell arrays 110b and a plurality of page buffers 140b1 to 140b4. Each of other memory devices 1312 to 1317 and 1319 may be configured to be the same as or similar to those illustrated in FIG. 5.

The memory cell arrays 110b may include memory cell arrays of a plane unit. For example, the memory cell arrays 110b may include a memory cell array of a plane PLN1, a memory cell array of a plane PLN2, a memory cell array of a plane PLN3, and a memory cell array of a plane PLN4.

The memory cell arrays of respective planes PLN1 to PLN4 may operate mutually independently. For example, the memory cell array of the plane PLN1 may operate independently of the memory cell array of the plane PLN2.

The memory cell array of the plane PLN1 may include a plurality of memory blocks BLK11 to BLK1z, and the memory cell array of the plane PLN2 may include a plurality of memory blocks BLK21 to BLK2z. The memory cell array of the plane PLN3 may include a plurality of memory blocks BLK31 to BLK3z, and the memory cell array of the plane PLN4 may include a plurality of memory blocks BLK41 to BLK4z.

The page buffers 140b1 to 140b4 may be separately provided to respectively correspond to the memory cell arrays of the planes PLN1 to PLN4. The page buffers 140b1 to 140b4 may be connected to the memory cell arrays of the planes PLN1 to PLN4 through separate bit lines BL1 to BL4. As the memory cell arrays of the planes PLN1 to PLN4 operate independently, the control logic circuit and voltage generator 130 may independently control the page buffers 140b1 to 140b4.

FIG. 5 illustrates four (4) planes PLN1 to PLN4. However, the present disclosure is not limited thereto. The number of planes may be variously changed or modified.

Figure 6:
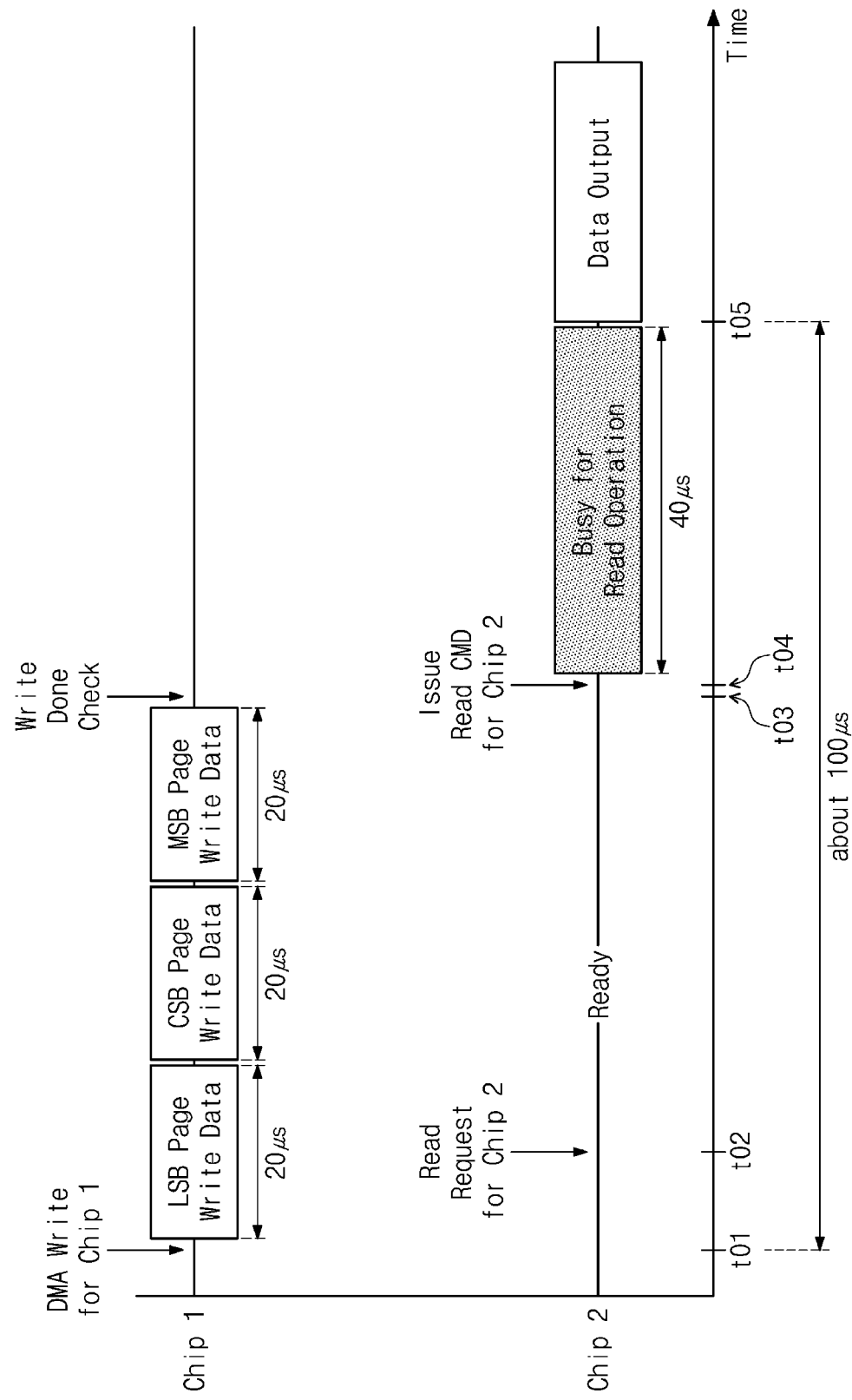
FIG. 6 is a timing diagram for describing example operations of a storage device associated with an example configuration of FIG. 3.

FIG. 6 is a timing diagram for describing example operations of the storage device 1300 associated with the example configuration of FIG. 3.

Example embodiments may not be associated with an operation of a single memory chip and operations of memory chips connected to different channels, but they may be associated with operations of memory chips connected to the same channel. In the following descriptions, to facilitate better understanding, operations of the memory chip 1311 and the memory chip 1312 connected to the same channel CH1 will be described.

In addition, it will be assumed that the memory cell array 110a of the memory chip 1311 includes a triple level cell which is capable of storing three (3) bits. Under this assumption, a write operation performed on the memory chip 1311 may include a least significant bit (LSB) write operation for storing data of an LSB page, a central significant bit (CSB) write operation for storing data of a CSB page, and a most significant bit (MSB) write operation for storing data of an MSB page. However, the present disclosure is not limited to the assumption, and a configuration and a write operation of the memory cell array 110a may be variously changed or modified.

At a time point t01, the controller 1330 may issue a DMA write command to the memory chip 1311. In response to the DMA write command, the DMA write operation including the LSB write operation, the CSB write operation, and the MSB write operation may be performed on the memory chip 1311. During the DMA write operation, the controller 1330 may provide the memory chip 1311 with data of the LSB page, data of the CSB page, and data of the MSB page through the channel CH1.

Meanwhile, at a time point t02, the controller 1330 may receive a read request for data stored in the memory chip 1312 from the host 1100. However, the memory chip 1311 is communicating with the controller 1330 through the channel CH1 for the DMA write operation, and the memory chip 1312 may not be able to communicate with the controller 1330 through the channel CH1. Thus, the memory chip 1312 may be ready to operate, but a read operation for the memory chip 1312 may not be immediately performed.

At a time point t03, the controller 1330 may check that the DMA write operation is completed. Afterwards, at a time point t04, the controller 1330 may issue a read command corresponding to the read request received at the time point t02, to the memory chip 1312. In response to the read command, a read operation for the memory chip 1312 may be performed to read data requested by the host 1100 from the memory chip 1312. After the read operation is completed, at a time point t05, the data requested by the host 11000 may be output from the memory chip 1312.

For example, time taken to perform each of the LSB write operation, the CSB write operation, and the MSB write operation may be 20 µs, and time taken to perform the read operation may be 40 µs. In this example, a time length between the time point t01 where the DMA write command is issued and the time point t05 where the memory chip 1312 outputs data may be about 100 µs. That is, time that exceeds 100 µs may be taken until the memory chip 1312 outputs data after the DMA write command is issued. These time values are provided as examples to facilitate better understanding, and are not intended to limit the present disclosure.

When data is output late from the memory chip 1312, quality of service (QoS) for the host 1100 may be degraded. Accordingly, reducing time taken to output data from the memory chip 1312 may be advantageous to improve the quality of service.

Figure 7:
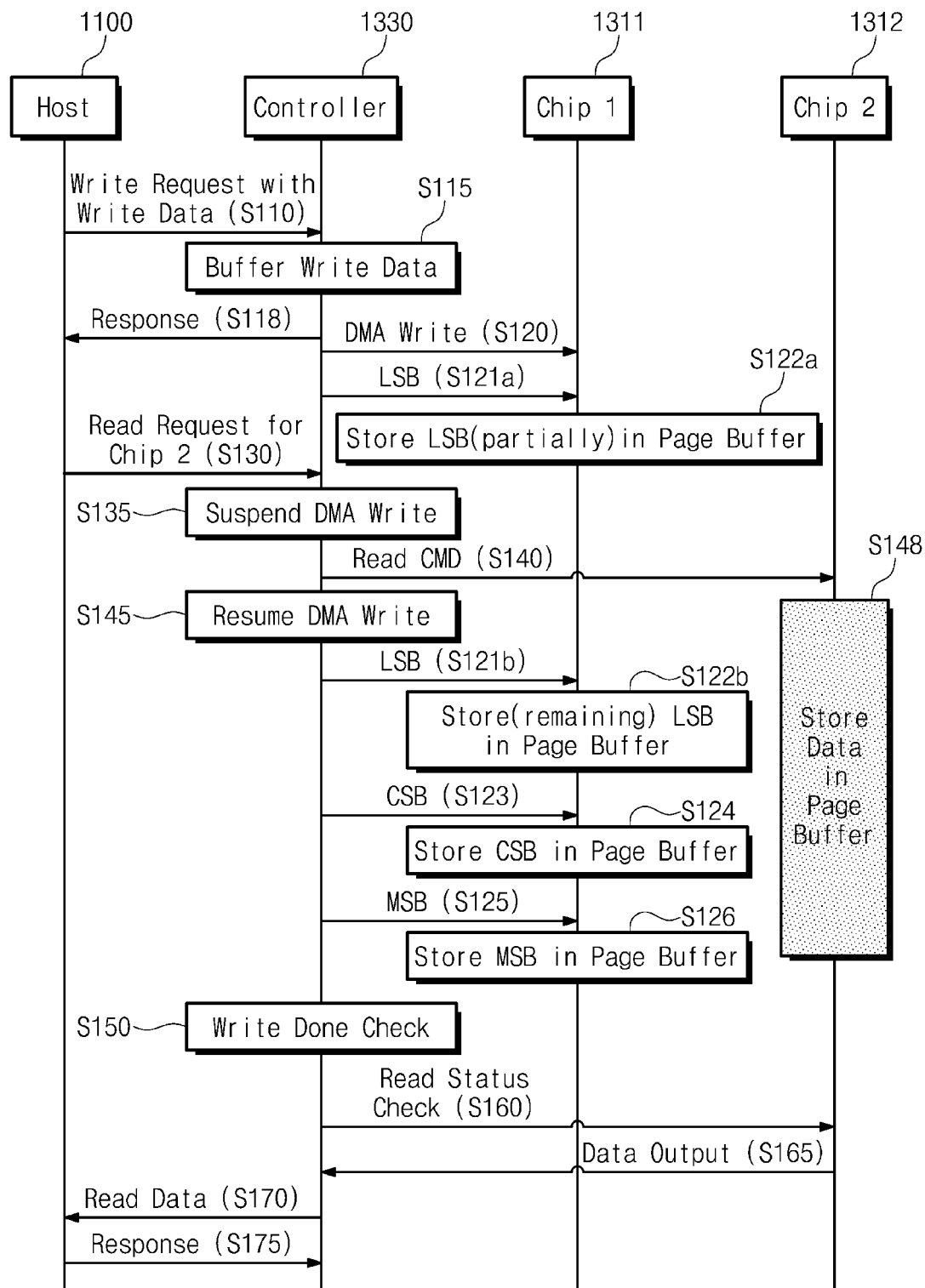
FIG. 7 is a flowchart describing example operations of a storage device associated with an example configuration of FIG. 3.
Figure 8:
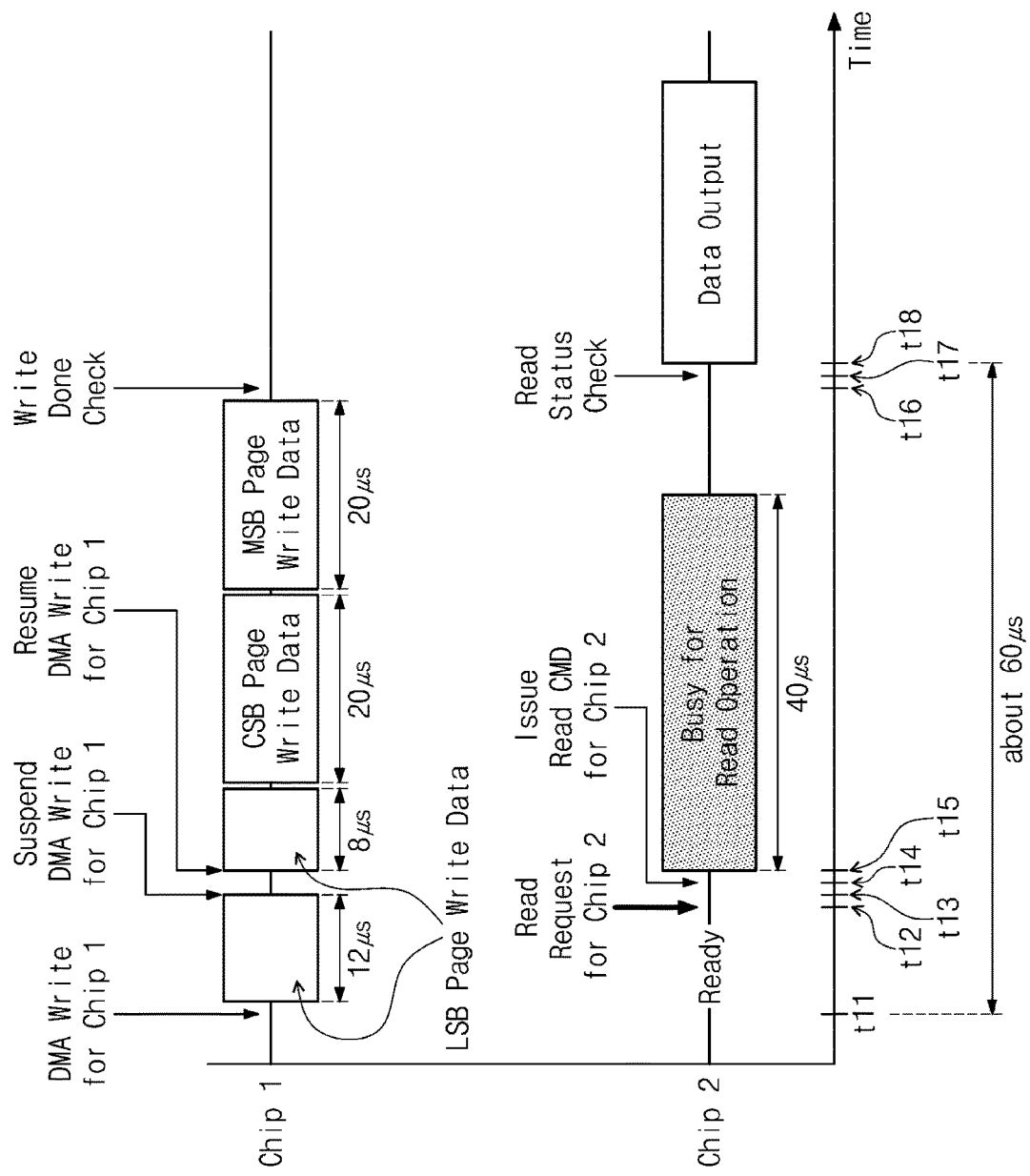
FIG. 8 is a timing diagram for describing example operations of FIG. 7.

FIG. 7 is a flowchart describing example operations of the storage device 1300 associated with the example configuration of FIG. 3. FIG. 8 is a timing diagram for describing the example operations of FIG. 7.

The host 1100 may provide the controller 1330 with a write request and write data (S110 of FIG. 7). The controller 1330 may temporarily store the write data in the internal buffer 1331 and/or the buffer memory 1350 (S115 of FIG. 7). The controller 1330 may provide a response indicating that the write data is well received to the host 1100 (S118 of FIG. 7).

When data of a size required for a write operation is accumulated, the controller 1330 may issue a DMA write command directed to the memory chip 1311 through the channel CH1 (S120 of FIG. 7 and a time point t11 of FIG. 8). To this end, the controller 1330 may communicate with the memory chip 1311 through the channel CH1 without intervention of the host 1100. The controller 1330 may provide data of an LSB page to the memory chip 1311 through the channel CH1 (S121a of FIG. 7).

For example, while the controller 1330 processes the DMA write operation for an LSB write operation, the controller 1330 may receive a read request directed to the memory chip 1312 from the host 1100 (S130 of FIG. 7 and a time point t12 of FIG. 8). The controller 1330 may suspend the DMA write operation for the memory chip 1311, in response to the read request (S135 of FIG. 7 and a time point t13 of FIG. 8).

Before the controller 1330 suspends the DMA operation, the memory chip 1311 may partially store or output data to be stored in the memory chip 1311 or to be output from the memory chip 1311 by the DMA operation. For example, data associated with the DMA write operation may not be completely stored in the memory chip 1311, and the data of the LSB page may be partially stored in the page buffer 140a of the memory chip 1311 (S122a of FIG. 7).

As the DMA write operation for the memory chip 1311 is suspended, the channel CH1 may become available for communication between the memory chip 1312 and the controller 1330. Accordingly, while suspending the communication with the memory chip 1311, the controller 1330 may communicate with the memory chip 1312 through the channel CH1 with regard to the read request. The controller 1330 may transmit a read command associated with the read request received at the time point t12 to the memory chip 1312 through the channel CH1 (S140 of FIG. 7 and a time point t14 of FIG. 8).

After transmitting the read command to the memory chip 1312, the controller 1330 may resume the suspended DMA write operation (S145 of FIG. 7 and a time point t15 of FIG. 8). That is, the controller 1330 may successively perform the DMA write operation without waiting for data being output from the memory chip 1312. The controller 1330 may resume the suspended communication with the memory chip 1311 through the channel CH1 without intervention of the host 1100.

Meanwhile, in response to the read command, a read operation for the memory chip 1312 may be performed to read data requested by the host 1100 from the memory chip 1312. During the read operation, data stored in memory cells of the memory chip 1312 may be read. The memory chip 1312 may temporarily store data read from the memory cells in a page buffer of the memory chip 1312 (S148 of FIG. 7).

While the controller 1330 processes the resumed DMA write operation, in response to the read command, the data read from the memory cells of the memory chip 1312 may be stored in the page buffer of the memory chip 1312. Storing data of memory cells in a page buffer may be performed inside the memory chip 1312, and may not occupy the channel CH1. Accordingly, the resumed communication between the memory chip 1311 and the controller 1330 may be performed concurrently with storing the data read from the memory cells of the memory chip 1312 in the page buffer of the memory chip 1312.

As the DMA write operation is resumed through the channel CH1, the controller 1330 may provide the memory chip 1311 with the data of the LSB page which has not been provided yet to the memory chip 1311 (S121*b* of FIG. 7). In addition, the controller 1330 may provide data of a CSB page and data of an MSB page to the memory chip 1311 through the channel CH1 (S123 and S125 of FIG. 7).

After the controller 1330 resumes the suspended DMA operation, the memory chip 1311 may store or output remaining data other than the partially stored or output data. For example, remaining data of the LSB page, the data of the CSB page, and the data of the MSB page may be stored in the page buffer 140*a* of the memory chip 1311 (S122*b*, S124, and S126 of FIG. 7). Accordingly, the data associated with the DMA write operation may be completely stored in the memory chip 1311, and the controller 1330 may check that the DMA write operation is completed (S150 of FIG. 7 and a time point t16 of FIG. 8).

After the DMA write operation is completed (e.g., after the resumed communication between the memory chip 1311 and the controller 1330 is terminated), the controller 1330 may check a status of the read operation in the memory chip 1312 (S160 of FIG. 7 and a time point t17 of FIG. 8). When the read operation is completed (e.g., when data of memory cells is completely read to a page buffer), the memory chip 1312 may output the data stored in the page buffer (S165 of FIG. 7 and a time point t18 of FIG. 8). Accordingly, the memory chip 1312 may output the data requested by the host 1100 to the controller 1330 through the channel CH1.

Afterwards, the controller 1330 may output the read data to the host 1100 (S170 of FIG. 7). The read data may be output based on the data output from the memory chip 1312. The host 1100 may provide a response indicating that the read data is well received by the controller 1330 (S175 of FIG. 7).

In the example of FIGS. 7 and 8, a time length between the time point t11 where the DMA write command is issued and the time point t18 where the memory chip 1312 outputs data may be about 60 μs. While the DMA write operation for the memory chip 1311 is processed, the read operation for the memory chip 1312 may be concurrently performed. Accordingly, time taken until the memory chip 1312 outputs data after the DMA write command is issued may be shortened, in comparison to the example of FIG. 6. When a capacity of the page buffer of the memory chip 1312 becomes greater, beginning the read operation for the memory chip 1312 earlier may be more advantageous.

In the example of FIGS. 7 and 8, it has been described that the read request directed to the memory chip 1312 is received during the LSB write operation. However, the present disclosure is not limited thereto. For example, the read request may be received during the DMA write operation or at any time point regardless of the DMA write operation. When the read request is received during the DMA write operation (e.g., during a CSB write operation or an MSB write operation), the DMA write operation may be temporarily suspended.

In addition, in the example of FIGS. 7 and 8, the DMA write operation directed to the memory chip 1311 has been described. However, such descriptions are provided to facilitate better understanding, and are not intended to limit the present disclosure. The example of FIGS. 7 and 8 may be similarly applied with regard to a DMA read operation and any other internal operations directed to the memory chip 1311.

For example, when the controller 1330 receives a read request directed to the memory chip 1312 from the host 1100 while processing a DMA read operation directed to the memory chip 1311, the controller 1330 may suspend the DMA read operation. The controller 1330 may issue a read command to the memory chip 1312 while suspending the DMA read operation, and afterwards, may resume the suspended DMA read operation.

According to the example of FIGS. 7 and 8, the storage device 1300 may temporarily suspend the DMA operation to rapidly respond to the read request from the host 1100. The storage device 1300 may rapidly output read data requested from the host 1100, and may provide a short, read response time for the read request from the host 1100. Accordingly, the quality of service and satisfaction of the user may be improved.

Figure 9:
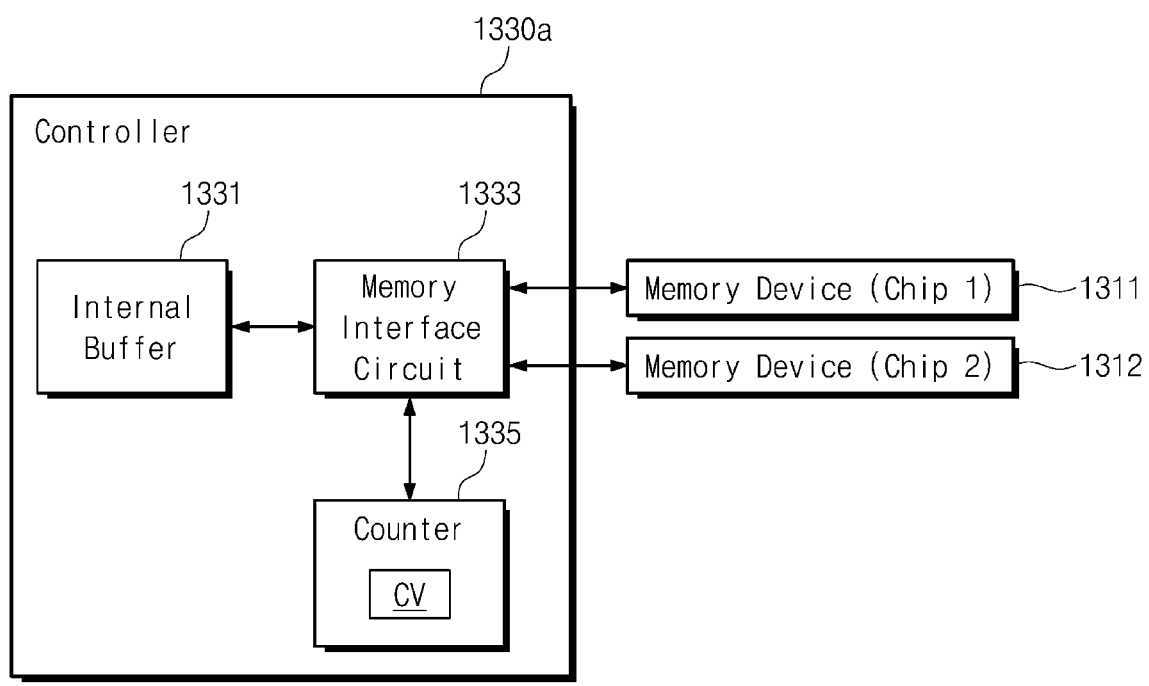
FIG. 9 is a block diagram illustrating an example configuration associated with a controller of FIG. 3.

FIG. 9 is a block diagram illustrating an example configuration associated with the controller 1330 of FIG. 3. In some example embodiments, the controller 1330 may include a controller 1330*a* of FIG. 9. For example, the controller 1330*a* may include the internal buffer 1331, a memory interface circuit 1333, and a counter 1335.

The memory interface circuit 1333 may provide interfacing between the controller 1330*a* and memory devices (e.g., the memory chips 1311 and 1312). For example, the memory interface circuit 1333 may provide a data path between the internal buffer 1331 (and/or the buffer memory 1350) and the memory devices. The memory interface circuit 1333 may include various circuits such as a transmitter/receiver circuit, an encoding/decoding circuit, and/or the like.

The counter 1335 may manage a count value CV. The count value CV may be associated with an amount of data exchanged between the memory devices and the controller 1330a according to a DMA operation. For example, the counter 1335 may increase the count value CV whenever data of a transmission unit size is exchanged between a memory chip and the controller 1330a. For example, the counter 1335 may include an up-counter circuit. The transmission unit size may correspond to a unit size of data exchanged between the controller 1330a and each memory chip.

The count value CV may be referenced to determine an amount of data that is provided to a memory chip according to a DMA write operation or an amount of data that is received from a memory chip according to a DMA read operation. For example, the count value CV may be reset (e.g., set to "0") in response to completion of the DMA operation.

As described with reference to FIGS. 7 and 8, the controller 1330a may temporarily suspend the DMA operation to respond to a read request from the host 1100. When the suspended DMA operation is resumed, the controller 1330a may obtain information associated with data to be exchanged with a memory chip immediately after the suspended DMA operation is resumed, based on the count value CV which has increased before the DMA operation is suspended.

For example, the controller 1330a may determine which data is exchanged next with a memory chip, based on the count value CV. For example, the controller 1330a may determine a memory location (e.g., an address) of a page buffer of a memory chip associated with the data to be exchanged next, based on the count value CV.

When the controller 1330a suspends the DMA operation, the controller 1330a may simply suspend the DMA operation without any suspend command. Alternatively, the controller 1330a may issue a suspend command such that a DMA operation for a memory chip is suspended.

When the controller 1330a resumes the suspended DMA operation, the controller 1330a may transmit information (e.g., address information) which is obtained based on the count value CV to a memory chip. For example, when the controller 1330a transmits the address information to a memory chip, the DMA operation may be resumed from a memory location of a page buffer directed by the address information.

When the controller 1330a resumes the suspended DMA operation, the controller 1330a may resume the DMA operation based on the address information without any resume command. Alternatively, the controller 1330a may issue a resume command such that the DMA operation for a memory chip is resumed.

Figure 10:
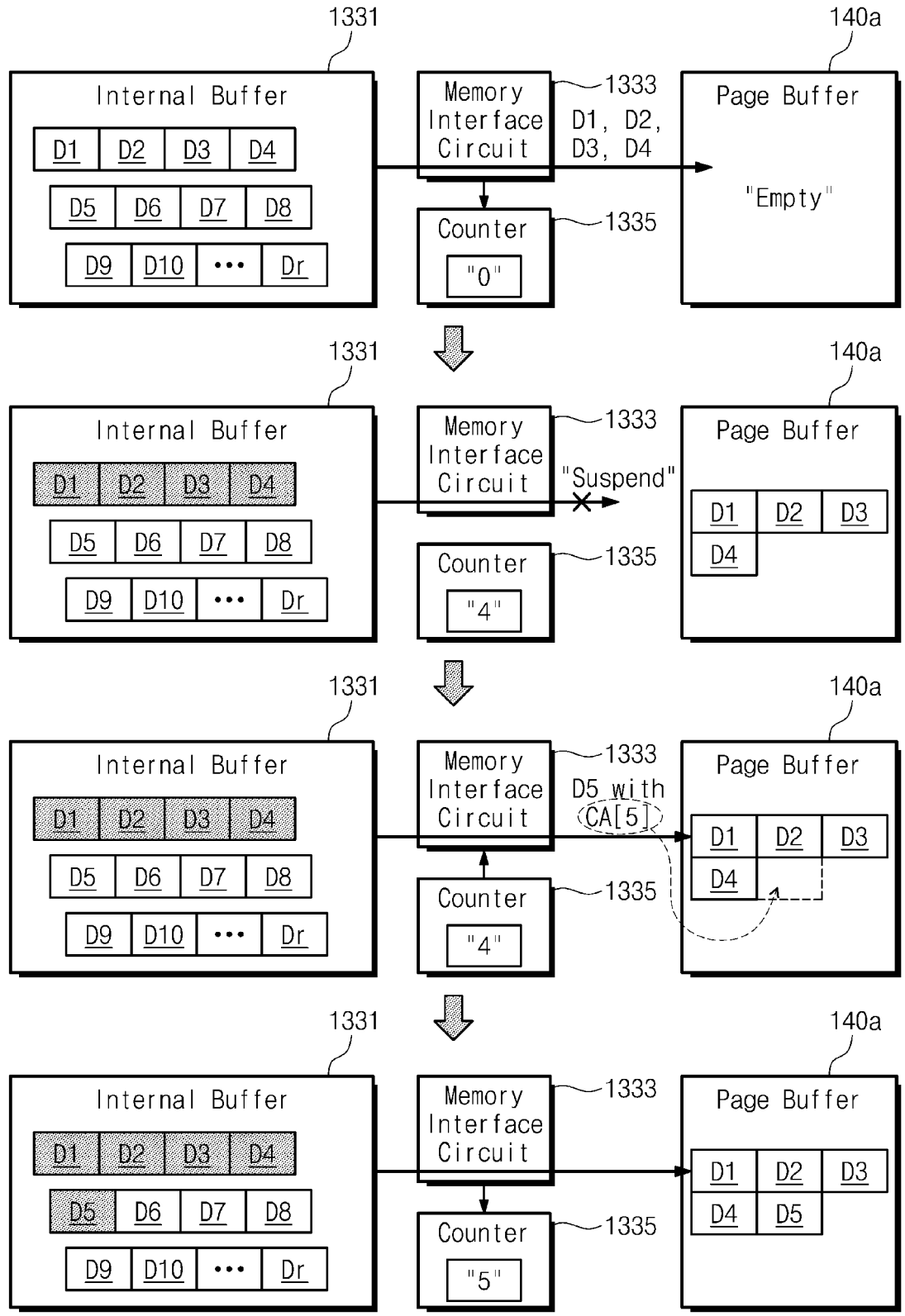
FIG. 10 is a conceptual diagram for describing example operations of a storage device associated with an example configuration of FIG. 9.

FIG. 10 is a conceptual diagram for describing example operations of the storage device 1300 associated with the example configuration of FIG. 9. For example, FIG. 10 illustrates a process of suspending and resuming a DMA write operation directed to the memory chip 1311.

For example, data D1 to Dr may be stored in the internal buffer 1331 for transmission to the page buffer 140a. When the data D1 to Dr are not yet transmitted to the page buffer 140a, the count value CV may correspond to "0" and the page buffer 140a may be empty.

Afterwards, for example, the data D1 to D4 may be stored in the page buffer 140a. As data D1 to D4 of four (4) transmission unit sizes are transmitted to the page buffer 140a through the memory interface circuit 1333, the counter 1335 may increase the count value CV such that the count value CV corresponds to "4". For example, after the data D1 to D4 are transmitted, the controller 1330 may suspend the DMA write operation to respond to a read request.

When the suspended DMA write operation is resumed, the controller 1330 may determine that data D5 is to be transmitted next, with reference to the count value CV which corresponds to "4". In addition, the controller 1330 may transmit the data D5 and a column address CA[5], which indicates a memory location of the page buffer 140 at which the data D5 is to be stored, to the page buffer 140a.

As the data D5 is transmitted to the page buffer 140a through the memory interface circuit 1333, the counter 1335 may increase the count value CV such that the count value CV corresponds to "5". For example, after the data D1 to Dr are completely transmitted to the page buffer 140a, the count value CV may be reset to correspond to "0".

Figure 11:
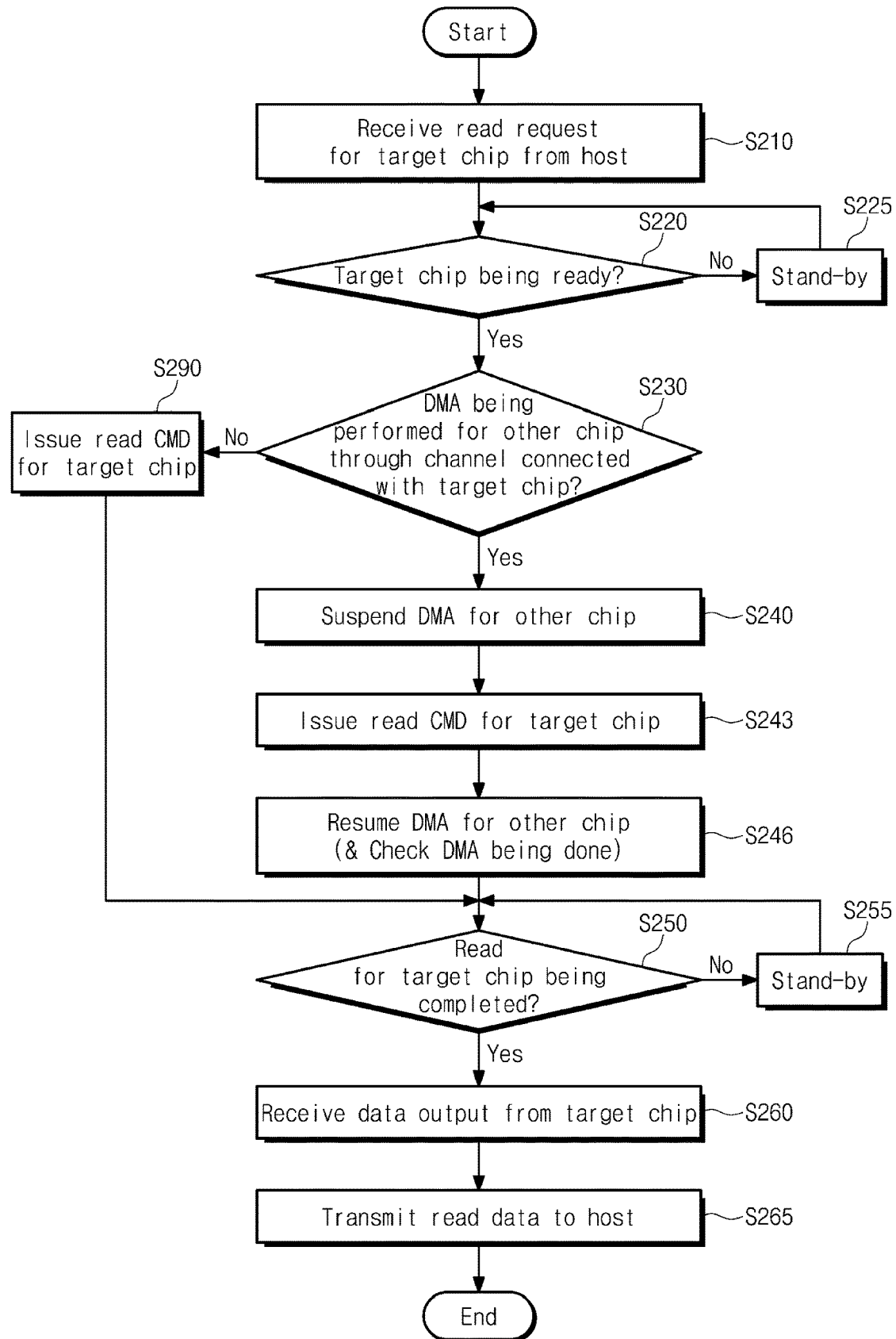
FIG. 11 is a flowchart describing an example operation of a controller associated with example operations of FIG. 7.

FIG. 11 is a flowchart describing an example operation of the controller 1330 associated with the example operations of FIG. 7.

The controller 1330 may receive a read request for a target memory chip from the host 1100 (S210). The target memory chip may be a memory chip (e.g., the memory chip 1312 of FIGS. 7 and 8) which stores data requested based on the read request.

The controller 1330 may check whether the target memory chip is ready to operate (S220). When the target memory chip is not ready to operate (No of S220), the controller 1330 may stand by to respond to the read request (S225). On the other hand, when the target memory chip is ready to operate (Yes of S220), the controller 1330 may determine whether a DMA operation for another memory chip is being performed through a channel connected to the target memory chip (S230).

When the DMA operation for other memory chip is being performed (Yes of S230), the controller 1330 may temporarily suspend the DMA operation (S240) and may issue a read command to the target memory chip (S243). Afterwards, the controller 1330 may resume the suspended DMA operation (S246). Meanwhile, when the DMA operation for other memory chip is not performed and a shared channel is available (No of S230), the controller 1330 may issue a read command to the target memory chip (S290).

When the DMA operation is completed or when the DMA operation is not performed, the controller 1330 may determine whether the read operation for the target memory chip is completed (S250). When the read operation is not completed (No of S250), the controller 1330 may stand by until the read operation is completed (S255). On the other hand, when the read operation is completed (Yes of S250), the controller 1330 may receive data output from the target memory chip (S260) and may output the read data to the host 1100 based on the received data (S265).

Figure 12:
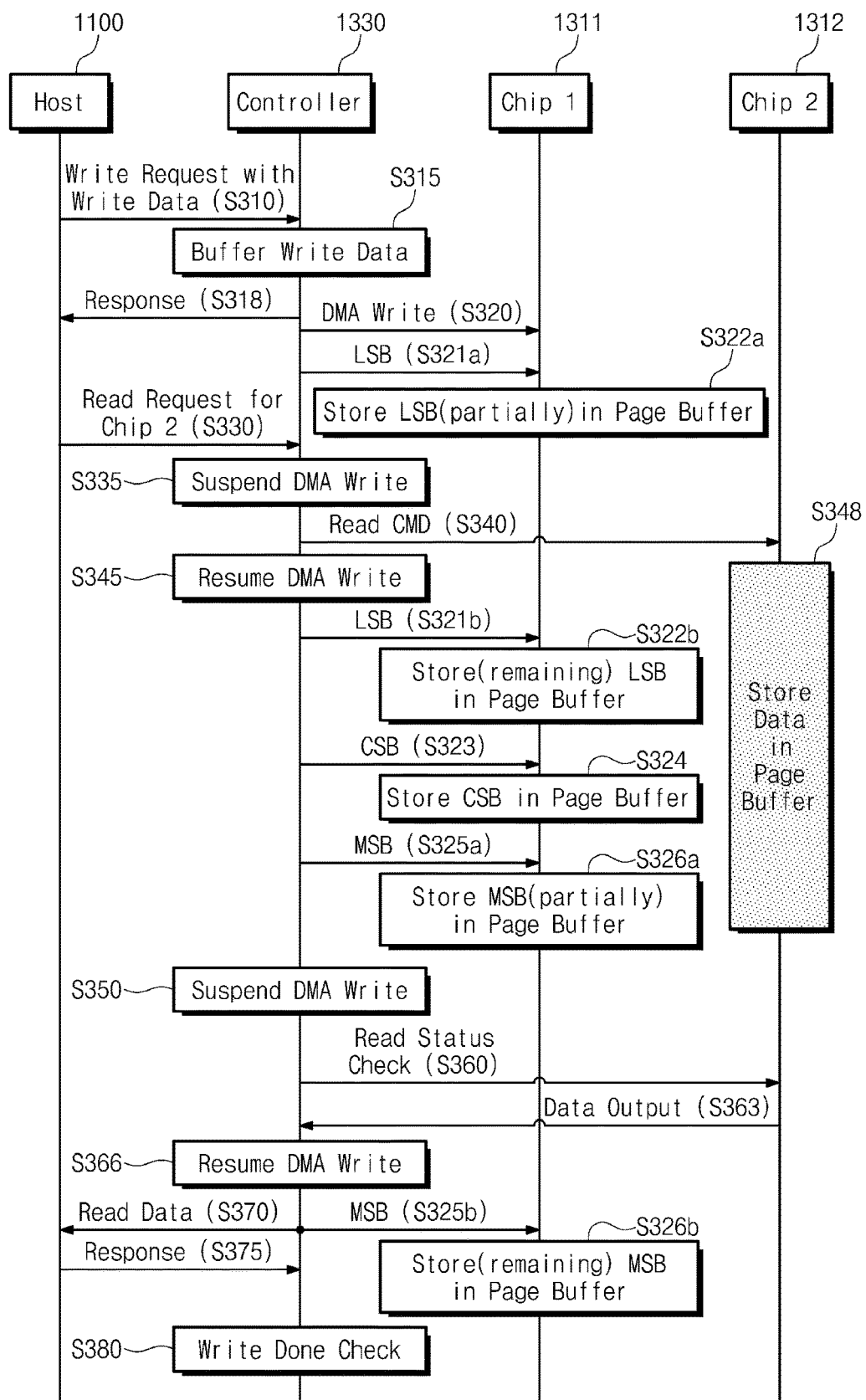
FIG. 12 is a flowchart describing example operations of a storage device associated with an example configuration of FIG. 3.
Figure 13:
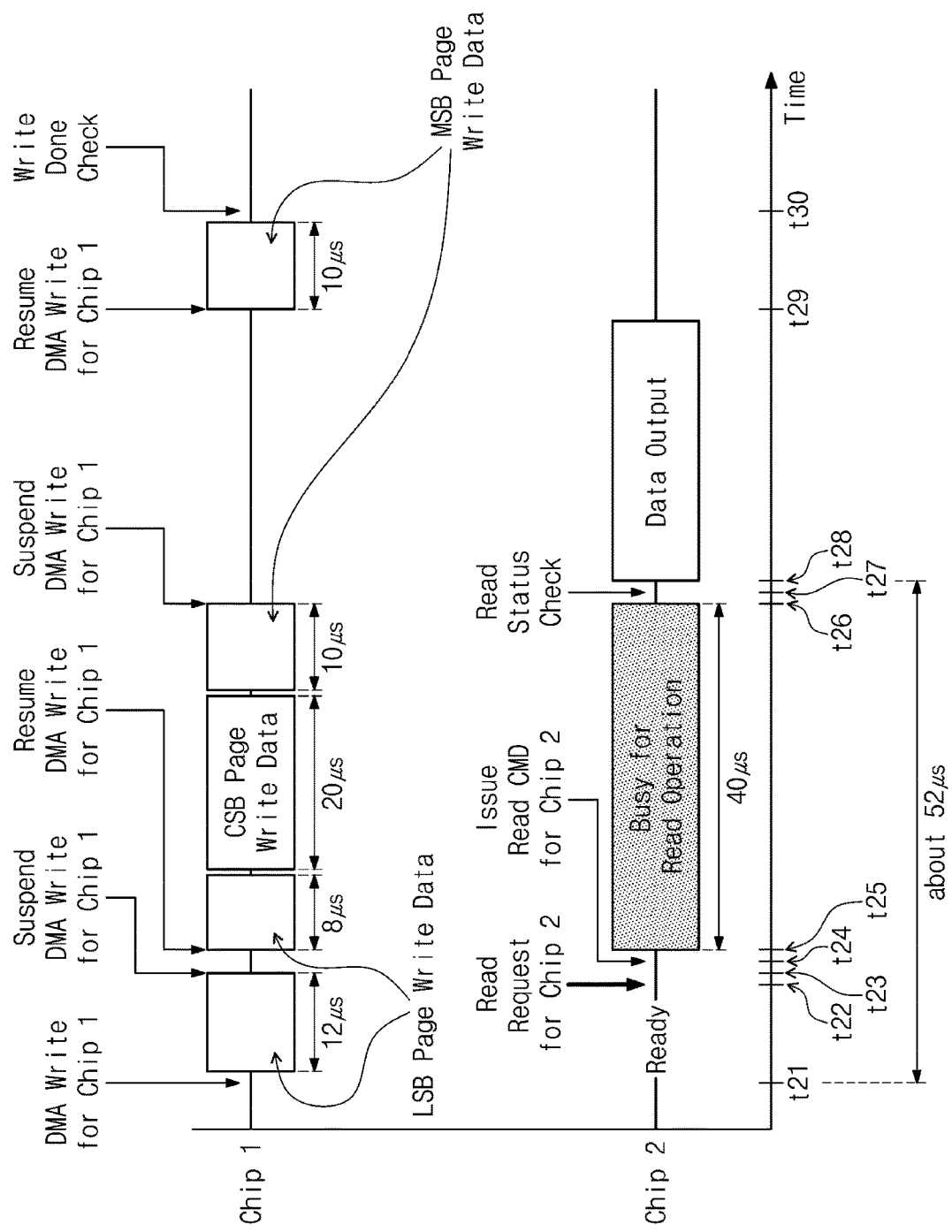
FIG. 13 is a timing diagram for describing example operations of FIG. 12.

FIG. 12 is a flowchart describing example operations of the storage device 1300 associated with the example configuration of FIG. 3. FIG. 13 is a timing diagram for describing the example operations of FIG. 12.

The host 1100 may provide a write request and write data to the controller 1330 (S310 of FIG. 12). The controller 1330 may temporarily store the write data in the internal buffer 1331 and/or the buffer memory 1350 (S315 of FIG. 12). The controller 1330 may provide the host 1100 with a response indicating that the write data is well received (S318 of FIG. 12).

When data of a size required for a write operation is accumulated, the controller 1330 may issue a DMA write command directed to the memory chip 1311 through the channel CH1 (S320 of FIG. 12 and a time point t21 of FIG.

13). In addition, the controller 1330 may provide data of an LSB page to the memory chip 1311 through the channel CH1 (S321*a* of FIG. 12).

For example, while the controller 1330 processes the DMA write operation for an LSB write operation, the controller 1330 may receive a read request directed to the memory chip 1312 from the host 1100 (S330 of FIG. 12 and a time point t22 of FIG. 13). The controller 1330 may suspend the DMA write operation for the memory chip 1311 in response to the read request (S335 of FIG. 12 and a time point t23 of FIG. 13). As the DMA write operation for the memory chip 1311 is suspended, the data of the LSB page may be partially stored in the page buffer 140*a* of the memory chip 1311 (S322*a* of FIG. 12).

While suspending communication with the memory chip 1311, the controller 1330 may transmit a read command associated with the read request received at the time point t22 to the memory chip 1312 through the channel CH1 (S340 of FIG. 12 and a time point t24 of FIG. 13). After transmitting the read command to the memory chip 1312, the controller 1330 may resume the suspended DMA write operation (S345 of FIG. 12 and a time point t25 of FIG. 13).

Meanwhile, in response to the read command, a read operation for the memory chip 1312 may be performed to read data requested by the host 1100 from the memory chip 1312. During the read operation, data stored in memory cells of the memory chip 1312 may be read. The memory chip 1312 may temporarily store the data read from the memory cells in a page buffer of the memory chip 1312 (S348 of FIG. 12).

As the DMA write operation is resumed through the channel CH1, the controller 1330 may provide the memory chip 1311 with data of the LSB page which has not been provided yet to the memory chip 1311 (S321*b* of FIG. 12). In addition, the controller 1330 may provide data of a CSB page and data of an MSB page to the memory chip 1311 through the channel CH1 (S323 and S325*a* of FIG. 12). Accordingly, remaining data of the LSB page, the data of the CSB page, and the data of the MSB page may be stored in the page buffer 140*a* of the memory chip 1311 (S322*b*, S324, and S326*a* of FIG. 12).

In some example embodiments, when a reference time lapses while the controller 1330 processes the resumed DMA write operation, the controller 1330 may re-suspend the resumed DMA write operation (S350 of FIG. 12 and a time point t26 of FIG. 13). As the DMA write operation for the memory chip 1311 is re-suspended, the data of the MSB page may be partially stored in the page buffer 140*a* of the memory chip 1311 (S326*a* of FIG. 12).

The reference time may be associated with a time expected as being taken to read data from memory cells of the memory chip 1312 to a page buffer of the memory chip 1312. For example, the reference time may be set to be substantially the same as the predicted time, or may be set to be a little shorter or a little longer than the predicted time.

After re-suspending communication with the memory chip 1311, the controller 1330 may check a status of the read operation in the memory chip 1312 through the channel CH1 (S360 of FIG. 12 and a time point t27 of FIG. 13). When the read operation is completed (i.e., when data of memory cells is completely read to a page buffer), the memory chip 1312 may output the data stored in the page buffer with regard to the read request (S363 of FIG. 12 and a time point t28 of FIG. 13).

While the memory chip 1312 outputs data through the channel CH1, communication between the memory chip 1311 and the controller 1330 through the channel CH1 may be suspended. That is, in the example of FIGS. 12 and 13, in order to process the read request directed to the memory chip 1312 earlier regardless of whether the DMA write operation for the memory chip 1311 is completed, the resumed DMA write operation may be re-suspended in response to the elapse of the reference time.

After the memory chip 1312 completely outputs the data based on the read command, the controller 1330 may resume the re-suspended DMA write operation (S366 of FIG. 12 and a time point t29 of FIG. 13). As the DMA write operation is resumed, the controller 1330 may provide the memory chip 1311 with data of the MSB page which has not been provided yet to the memory chip 1311 (S325*b* of FIG. 12).

In addition, remaining data of the MSB page may be stored in the page buffer 140*a* of the memory chip 1311 (S326*b* of FIG. 12). Accordingly, data associated with the DMA write operation may be completely stored in the memory chip 1311, and the controller 1330 may check that the DMA write operation is completed (S380 of FIG. 12 and a time point t30 of FIG. 13).

While the DMA write operation is successively performed, the controller 1330 may output the read data to the host 1100 (S370 of FIG. 12). The read data may be output based on the data output from the memory chip 1312. The host 1100 may provide the controller 1330 with a response indicating that the read data is well received (S375 of FIG. 12).

In the example of FIGS. 12 and 13, a time length between the time point t21 where the DMA write command is issued and the time point t28 where the memory chip 1312 outputs data may be about 52 μs. As the DMA write operation is suspended twice, the memory chip 1312 may output the data associated with the read request before the DMA write operation for the memory chip 1311 is completed. In some cases, the controller 1330 may output the read data to the host 1100 before the DMA write operation is completed. Accordingly, time taken until the memory chip 1312 outputs data after the DMA write command is issued may be further shortened, in comparison to the example of FIGS. 7 and 8.

In the example of FIGS. 12 and 13, it has been described that the read request directed to the memory chip 1312 is received during the LSB write operation and the resumed DMA write operation is re-suspended during an MSB write operation. However, the present disclosure is not limited thereto. The read request may be received during the DMA write operation or at any time point regardless of the DMA write operation, and the resumed DMA write operation may be re-suspended at any time point in response to the elapse of the reference time.

In addition, in the example of FIGS. 12 and 13, the DMA write operation directed to the memory chip 1311 has been described. However, such descriptions are provided to facilitate better understanding, and are not intended to limit the present disclosure. The example of FIGS. 12 and 13 may be similarly applied with regard to a DMA read operation and another internal operation directed to the memory chip 1311.

For example, the controller 1330 may issue a read command to the memory chip 1312 while the DMA read operation is suspended, and afterwards, may resume the suspended DMA read operation. When the reference time lapses while the resumed DMA read operation is processed, the controller 1330 may re-suspend the resumed DMA read operation. The memory chip 1312 may output data associated with the read request while the DMA read operation is re-suspended.

Figure 14:
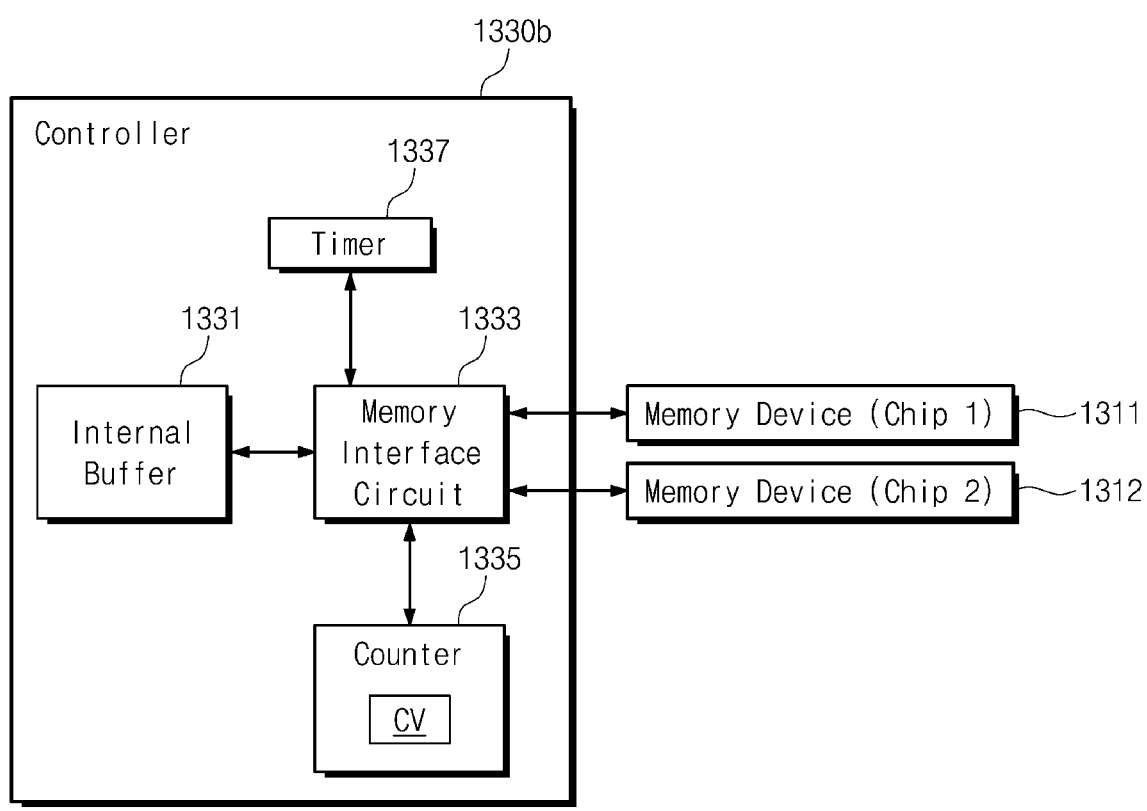
FIG. 14 is a block diagram illustrating an example configuration associated with a controller of FIG. 3.

FIG. 14 is a block diagram illustrating an example configuration associated with the controller 1330 of FIG. 3. In some example embodiments, the controller 1330 may include a controller 1330b of FIG. 14. For example, the controller 1330b may include the internal buffer 1331, the memory interface circuit 1333, the counter 1335, and a timer 1337.

The timer 1337 may measure the reference time. For example, the timer 1337 may include a timer circuit which is configured to count the elapse of time in response to a clock. For example, the timer 1337 may be reset in response to a DMA operation being resumed, and may notify the expiration of time in response to the elapse of the reference time. The controller 1330b may re-suspend the resumed DMA operation in response to the notification from the timer 1337.

Figure 15:
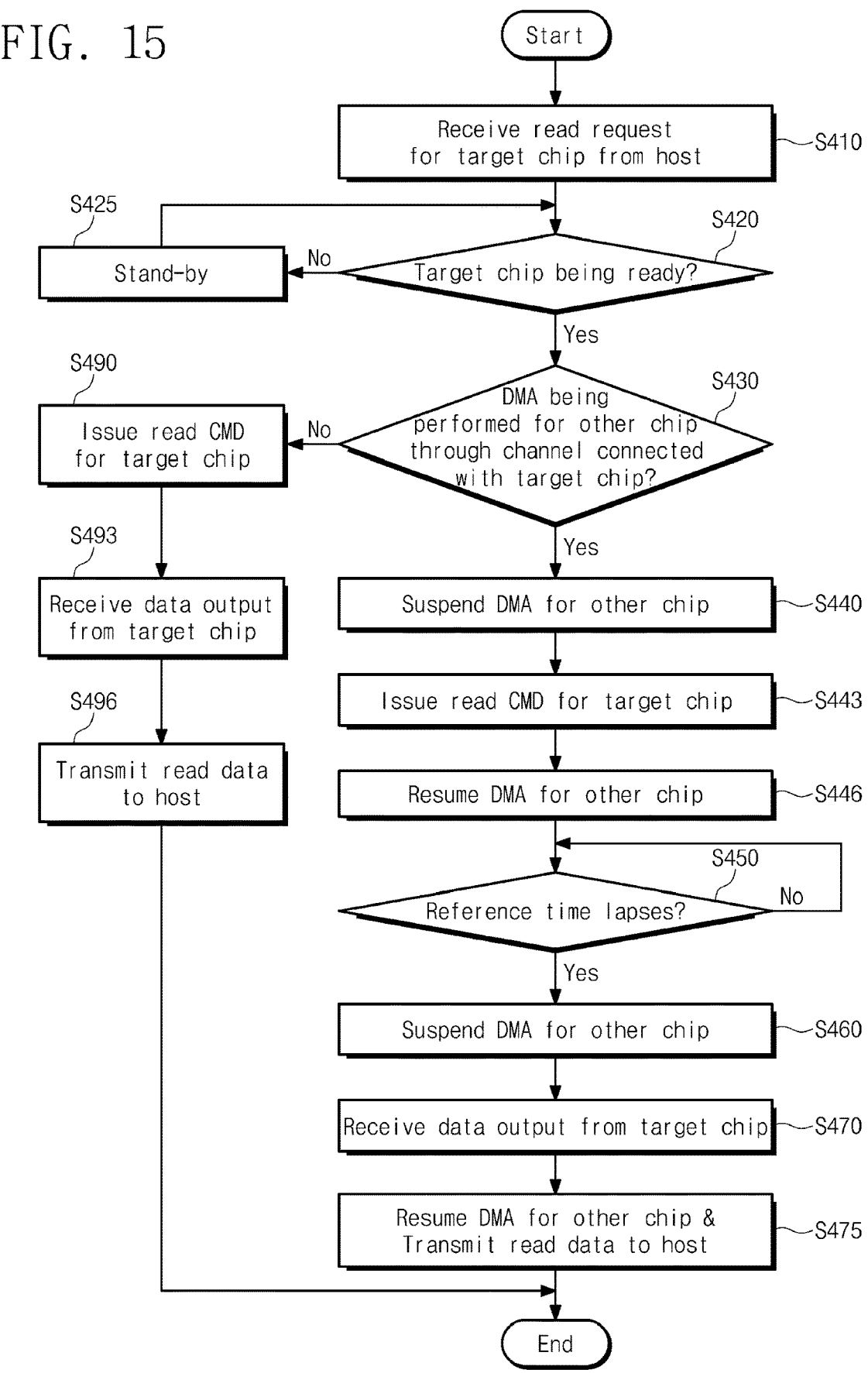
FIG. 15 is a flowchart describing an example operation of a controller associated with example operations of FIG. 12.

FIG. 15 is a flowchart describing an example operation of the controller 1330 associated with the example operations of FIG. 12.

The controller 1330 may receive a read request for a target memory chip from the host 1100 (S410). The controller 1330 may check whether the target memory chip is ready to operate (S420).

When the target memory chip is not ready to operate (No of S420), the controller 1330 may stand by to respond to the read request (S425). On the other hand, when the target memory chip is ready to operate (Yes of S420), the controller 1330 may determine whether a DMA operation for another memory chip is being performed through a channel connected with the target memory chip (S430).

When the DMA operation for another memory chip is being performed (Yes of S230), the controller 1330 may temporarily suspend the DMA operation (S440) and may issue a read command to the target memory chip (S443). Afterwards, the controller 1330 may resume the suspended DMA operation (S446).

The controller 1330 may determine whether a reference time lapses after the DMA operation is resumed (S450). When the reference time does not lapse (No of S450), the controller 1330 may continuously perform the DMA operation. On the other hand, when the reference time lapses (Yes of S450), the controller 1330 may re-suspend the DMA operation (S460). While the DMA operation is re-suspended, the controller 1330 may receive data output from the target memory chip (S470) and, thereafter, may output the read data to the host 1100 based on the received data and resume the re-suspended DMA operation (S475).

Meanwhile, when the DMA operation for other memory chip is not performed and a shared channel is available (No of S430), the controller 1330 may issue a read command to the target memory chip (S490). Accordingly, the controller 1330 may receive data output from the target memory chip (S493) and may output the read data to the host 1100 based on the received data (S496).

Figure 16:
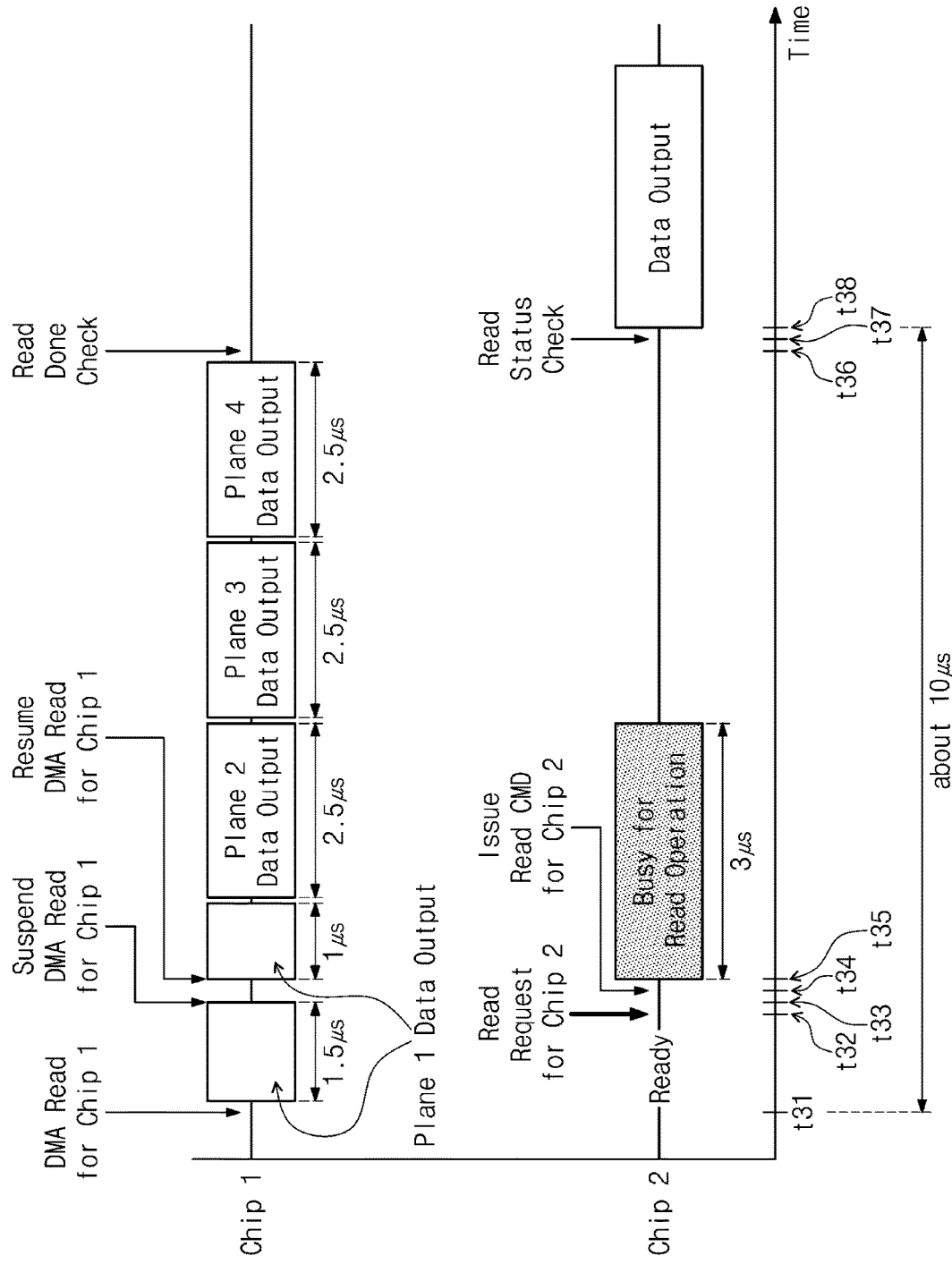
FIGS. 16 and 17 are timing diagrams for describing example operations of a storage device associated with example configurations of FIGS. 3 and 5.

FIG. 16 is a timing diagram for describing example operations of the storage device 1300 associated with the example configurations of FIGS. 3 and 5. The example operations of FIG. 16 may be associated with the multi-plane structure of FIG. 5.

In some cases, the controller 1330 may determine that a DMA read operation directed to the memory chip 1311 is required, and may issue a DMA read command to the memory chip 1311 (at a time point t31). To this end, the controller 1330 may communicate with the memory chip 1311 through the channel CH1 without intervention of the host 1100. Data of the memory cell array of the plane PLN1 may be output to the controller 1330 through the channel CH1.

For example, while the controller 1330 processes an operation directed to the memory cell array of the plane PLN1, the controller 1330 may receive a read request directed to the memory chip 1312 from the host 1100 (at a time point t32). The controller 1330 may temporarily suspend the DMA read operation for the memory chip 1311 in response to the read request (at a time point t33). Before the controller 1330 suspends the DMA read operation, data to be output from the memory chip 1311 by the DMA read operation may be partially output.

As the operation directed to the memory cell array of the plane PLN1 is partially processed and suspended, the controller 1330 may transmit a read command associated with the read request received at the time point t32 to the memory chip 1312 through the channel CH1 (at a time point t34). After transmitting the read command to the memory chip 1312, the controller 1330 may resume the suspended DMA read operation (at a time point t35).

Meanwhile, in response to the read command, a read operation for the memory chip 1312 may be performed to read data requested by the host 1100 from the memory chip 1312. During the read operation, the memory chip 1312 may temporarily store the data read from memory cells in a page buffer of the memory chip 1312. The resumed communication between the memory chip 1311 and the controller 1330 may be performed concurrently with storing the data read from the memory cells of the memory chip 1312 in the page buffer of the memory chip 1312.

As the DMA read operation is resumed through the channel CH1, the controller 1330 may process an operation of a remaining portion which has not been processed in the partially processed operation. For example, the controller 1330 may receive remaining data, which has not been output yet, of the memory cell array of the plane PLN1. In addition, the controller 1330 may receive data of the memory cell array of the plane PLN2, data of the memory cell array of the plane PLN3, and data of the memory cell array of the plane PLN4 through the channel CH1.

After the controller 1330 resumes the suspended DMA read operation, the memory chip 1311 may output the remaining data other than the partially output data. Accordingly, data associated with the DMA read operation may be completely output from the memory chip 1311, and the controller 1330 may check that the DMA read operation is completed (at a time point t36). After the DMA read operation is completed, the controller 1330 may check a status of the read operation in the memory chip 1312 (at a time point t37).

When the read operation is completed, the memory chip 1312 may output the data stored in the page buffer (at a time point t38). The memory chip 1312 may output the data requested by the host 1100 to the controller 1330 through the channel CH1. The controller 1330 may output the read data to the host 1100 based on the data output from the memory chip 1312.

For example, time taken to output data from a memory cell array of one plane may be 1.5 μs, and time taken to process a read request from the host 1100 may be 3 μs. In this example, a time length between the time point t31 where the DMA read command is issued and the time point t38 where the memory chip 1312 outputs data may be about 10 μs. However, these time values are provided as examples to facilitate better understanding, and are not intended to limit the present disclosure.

If the controller 1330 responds to the read request after the DMA read operation is completed without suspending the DMA read operation, time taken for the memory chip 1312 to output data after the DMA read command is issued may be about 13 µs. Accordingly, it may be understood that suspending the DMA read operation and responding to the read request is advantageous to rapidly output the data requested by the host 1100. In addition, it may be understood that the example embodiments are also effective for the multi-plane structure.

In the example of FIG. 16, it has been described that the read request directed to the memory chip 1312 is received during an operation of the memory cell array of the plane PLN1. However, the present disclosure is not limited thereto. For example, the read request may be received at any time point. In addition, the example of FIG. 16 may be associated with the DMA read operation on the multi-plane structure, but the example of FIG. 16 may be applied similarly with regard to a DMA write operation on the multi-plane structure.

Figure 17:
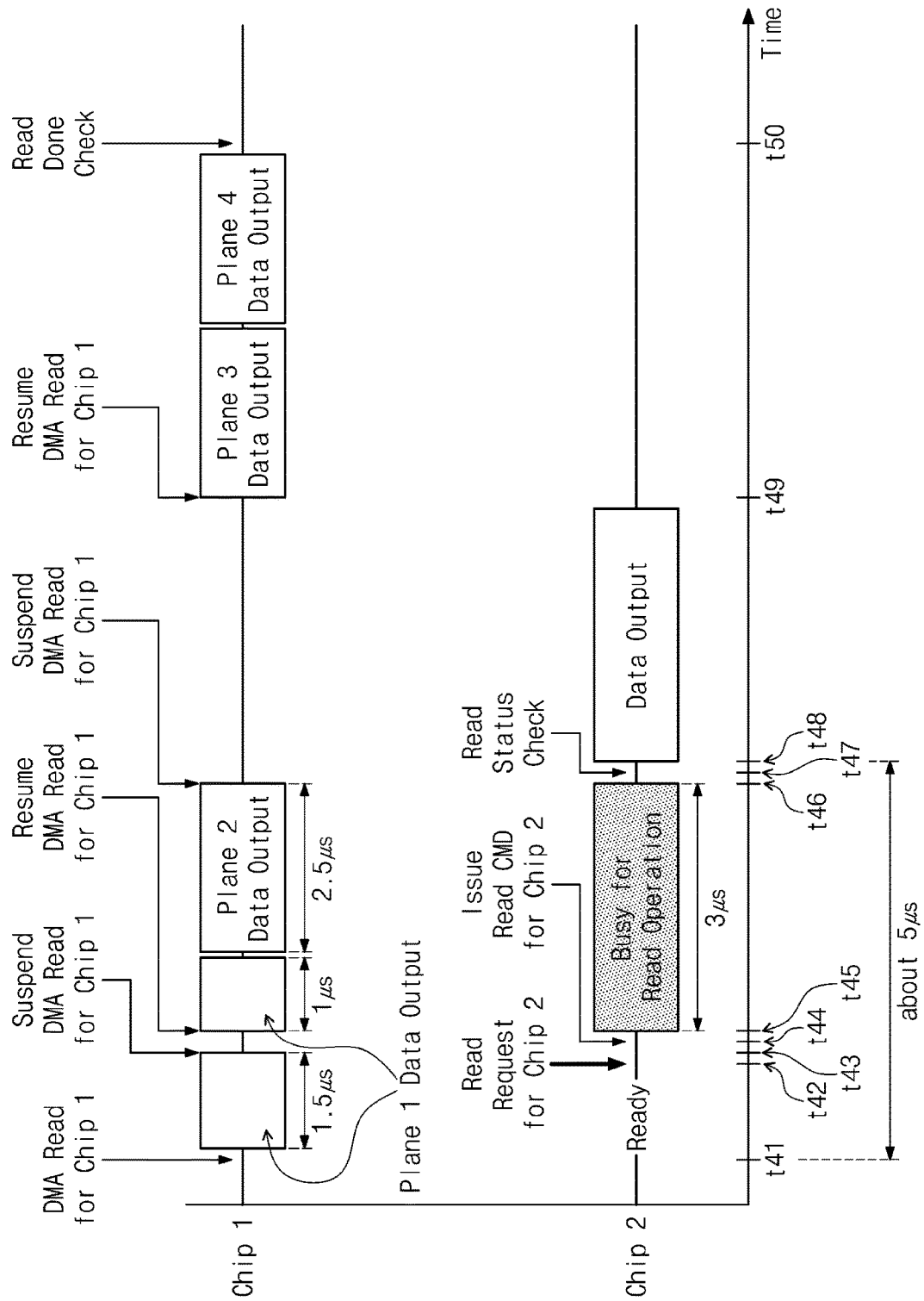

FIG. 17 is a timing diagram for describing example operations of the storage device 1300 associated with the example configurations of FIGS. 3 and 5. The example operations of FIG. 17 may be associated with the multi-plane structure of FIG. 5.

Similar to the example of FIG. 16, the controller 1330 may issue a DMA read command to the memory chip 1311 (at a time point t41). Accordingly, data of the memory cell array of the plane PLN1 may be output to the controller 1330 through the channel CH1. For example, while the controller 1330 processes an operation directed to the memory cell array of the plane PLN1, the controller 1330 may receive a read request directed to the memory chip 1312 from the host 1100 (at a time point t42).

The controller 1330 may temporarily suspend the DMA read operation for the memory chip 1311 in response to the read request (at a time point t43). While suspending communication with the memory chip 1311, the controller 1330 may transmit a read command to the memory chip 1312 through the channel CH1 (at a time point t44).

After transmitting the read command to the memory chip 1312, the controller 1330 may resume the suspended DMA read operation (at a time point t45). As the DMA read operation is resumed through the channel CH1, the controller 1330 may receive, from the memory chip 1311, remaining data, which has not been output yet, of the memory cell array of the plane PLN1 and data of the memory cell array of the plane PLN2.

In some example embodiments, when a reference time lapses while the controller 1330 processes the resumed DMA read operation, the controller 1330 may re-suspend the resumed DMA read operation (at a time point t46). After re-suspending the communication with the memory chip 1311, the controller 1330 may check a status of the read operation in the memory chip 1312 through the channel CH1 (at a time point t47). When the read operation is completed, the memory chip 1312 may output data associated with the read request to the controller 1330 (at a time point t48).

After the memory chip 1312 completely outputs the data based on the read command, the controller 1330 may resume the re-suspended DMA read operation (at a time point t49). As the DMA read operation is resumed, the controller 1330 may receive, from the memory chip 1311, data of the memory cell array of the plane PLN3 and data of the memory cell array of the plane PLN4. Accordingly, data associated with the DMA read operation may be completely output from the memory chip 1311, and the controller 1330 may check that the DMA read operation is completed (at a time point t50).

In the example of FIG. 17, a time length between the time point t41 where the DMA read command is issued and the time point t48 where the memory chip 1312 outputs data may be about 5 µs. According to the example of FIG. 17, time taken until the memory chip 1312 outputs data after the DMA read command is issued may be further shortened, in comparison to the example of FIG. 16.

In the example of FIG. 17, it has been described that the read request directed to the memory chip 1312 is received during an operation of the memory cell array of the plane PLN1 and the resumed DMA read operation is re-suspended after an operation of the memory cell array of the plane PLN2. However, the present disclosure is not limited thereto. The read request may be received at any time point, and the resumed DMA read operation may be re-suspended at any time point in response to the elapse of the reference time. In addition, the example of FIG. 17 may be associated with the DMA read operation on the multi-plane structure, but the example of FIG. 17 may be applied similarly with regard to a DMA write operation on the multi-plane structure.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The above descriptions are intended to provide example configurations and operations for implementing the present disclosure. The scope and spirit of the present disclosure may include implementations which are obtained by simply changing or modifying the above example embodiments, in addition to the above-described example embodiments. Also, the scope and spirit of the present disclosure includes implementations which are accomplished by easily changing or modifying the above-described example embodiments afterwards.

What is claimed is:

1. A storage device comprising:
    a first memory chip including a plurality of first planes, each of the plurality of first planes operating mutually independently in the first memory chip;
    a second memory chip including a plurality of second planes, each of the plurality of second planes operating mutually independently in the second memory chip; and
    a controller connected to the first memory and the second memory chip through a first channel,
    wherein the controller is configured to:

perform a first direct memory access (DMA) read operation on the first memory chip through the first channel, the first DMA read operation including a plurality of plane data outputs for receiving a plurality of first page data from the plurality of first planes through the first channel, respectively;

receive a read request for the second memory chip from an external host while performing the first DMA read operation;

suspend the first DMA read operation to transmit a read command to the second memory chip through the first channel, in response to the read request; and resume the suspended first DMA read operation after transmitting the second command.

2. The storage device of claim 1, wherein: the first memory chip further comprises a plurality of first page buffers connected to the plurality of first planes, respectively, and wherein the second memory chip further comprises a plurality of second page buffers connected to the plurality of second planes, respectively.

3. The storage device of claim 2, wherein the second memory chip is configured to read at least one second page data from at least one of the plurality of second planes in response to the read command.

4. The storage device of claim 3, wherein:
the controller is further configured to:
check a status of the second memory chip through the first channel after completing the first DMA read operation; and
perform a second DMA read operation on the second memory chip through the first channel based on the status of the read operation,
the at least one second page data is temporarily stored in at least one of the plurality of second page buffers, and
the second DMA read operation includes receiving the at least one second page data from the at least one of the second page buffers through the first channel.

5. The storage device of claim 4, wherein the controller is configured to output the plurality of first page data to the external host while performing the second DMA read operation.

6. The storage device of claim 3, wherein:
the controller is further configured to:
re-suspend the resumed first DMA read operation after completing at least one of the plurality of plane outputs;
check a status of the second memory chip through the first channel;
perform a second DMA read operation on the second memory chip through the first channel based on the status of the second memory chip; and
resume the re-suspended first DMA read operation to perform a remaining plane data output operation of the plurality of plane data outputs after completing the second DMA read operation, and
the second DMA read operation includes receiving the at least one second page stored in the at least one of the second page buffers through the first channel.

7. The storage device of claim 6, wherein the controller is further configured to transmit the at least one second page data to the external host while performing the remaining plane data output operation.

8. The storage device of claim 1, wherein each of the plurality of plane outputs is performed during 2.5 micro seconds (µs).

9. The storage device of claim 1, wherein the controller is configured to suspend the first DMA read operation by suspending a plane page output operation of the plurality of first plane output operations, wherein the plane page output operation is in progress at the time of receiving the read request.

10. The storage device of claim 1, wherein:
a number of the plurality of first planes is greater than four, and
a number of the plurality of second planes is greater than four.

11. The storage device of claim 1, wherein the controller comprises an internal buffer memory configured to store the plurality of first page data received by the first DMA read operation.

* * * * *